United States Patent
Murray et al.

(10) Patent No.: US 7,319,321 B2
(45) Date of Patent: Jan. 15, 2008

(54) MAGNETIC SCREENING SYSTEM

(75) Inventors: Paul D. Murray, Chelmsford, MA (US); Louis S. Palecki, Southborough, MA (US); William C. Place, Acton, MA (US)

(73) Assignee: Assurance Technology Corporation, Carlisle, MA (US)

( * ) Notice: Subject to any disclaimer, the term of this patent is extended or adjusted under 35 U.S.C. 154(b) by 359 days.

(21) Appl. No.: 11/169,147

(22) Filed: Jun. 28, 2005

(65) Prior Publication Data

US 2007/0013372 A1     Jan. 18, 2007

Related U.S. Application Data

(63) Continuation of application No. 11/073,424, filed on Mar. 4, 2005, now abandoned.

(51) Int. Cl.
G01R 33/02     (2006.01)

(52) U.S. Cl. ................ 324/244; 340/551; 324/243

(58) Field of Classification Search ............. 324/243, 324/244, 248, 252, 253, 260; 340/551, 572.1
See application file for complete search history.

(56) References Cited

U.S. PATENT DOCUMENTS

| | | | |
|---|---|---|---|
| 4,723,118 A | 2/1988 | Hooley et al. | |
| 4,913,152 A | 4/1990 | Ko et al. | |
| 5,122,744 A | 6/1992 | Koch | |
| 6,150,810 A | 11/2000 | Roybal | |
| 6,841,994 B1 | 1/2005 | Wiegert | |
| 7,154,266 B2 * | 12/2006 | Czipott et al. | 324/244 |
| 2004/0147833 A1 | 7/2004 | Czipott et al. | |
| 2004/0147834 A1 | 7/2004 | Czipott et al. | |
| 2004/0169509 A1 | 9/2004 | Czipott et al. | |
| 2004/0189293 A1 | 9/2004 | Czipott et al. | |

OTHER PUBLICATIONS

"Honeywell Sensor Products: 1- and 2-Axis Magnetic Sensors," No date given.
A. Garachtchenko, "Baseline Distance Optimization for SQUID Gradiometers," *Applied Materials* (1998).
P. Ripka, M. Tondra, J. Stokes, and R. Beech, "AC- driven AMR and GMR magnetoresitors," *IOP Publishing*, ISBN 0 7503 363, pp. 967-969(1998).
Nonvolatile Electronics, Inc., "Engineering and Application Notes: Giant Magnetoresitive (GMR) Sensors," (1998).

* cited by examiner

*Primary Examiner*—Jay M Patidar
(74) *Attorney, Agent, or Firm*—Hamilton, Brook, Smith & Reynolds, P.C.

(57) ABSTRACT

A magnetic screening system including an arrangement of gradiometers each including at least three magnetometers, a gradiometer processor in communication with the magnetometers that scales outputs from the magnetometers with unequal weights and combines the scaled outputs to orient a direction of sensitivity of the respective gradiometer toward a volume of interest and at least one arrangement processor in communication with the arrangement of gradiometers that uses the gradiometers in a collective manner to detect a target object.

17 Claims, 18 Drawing Sheets

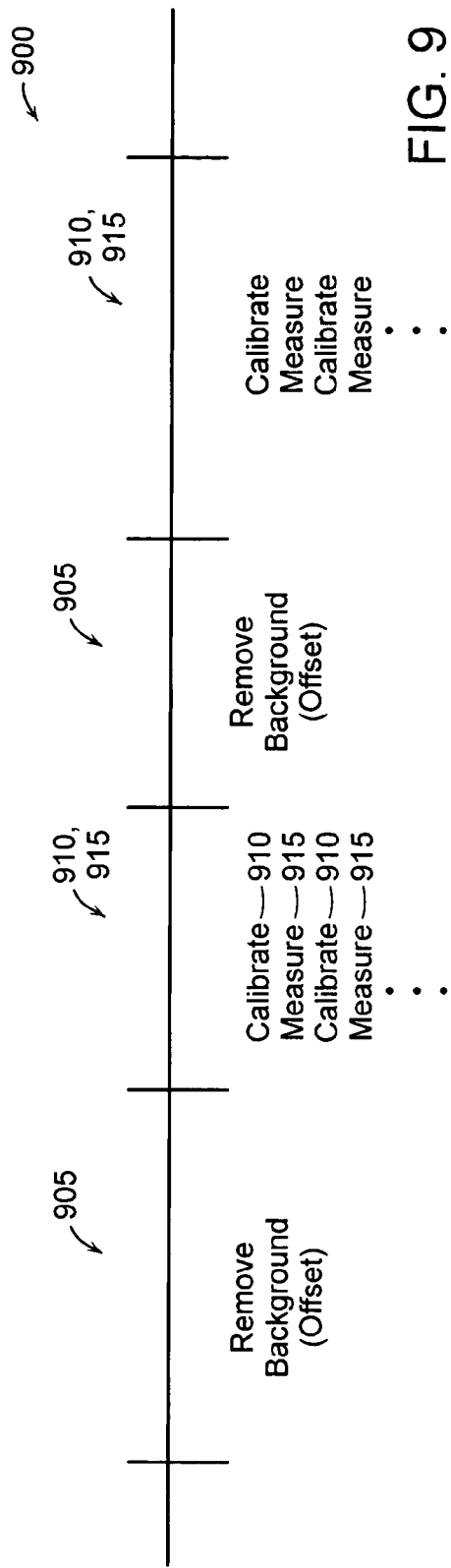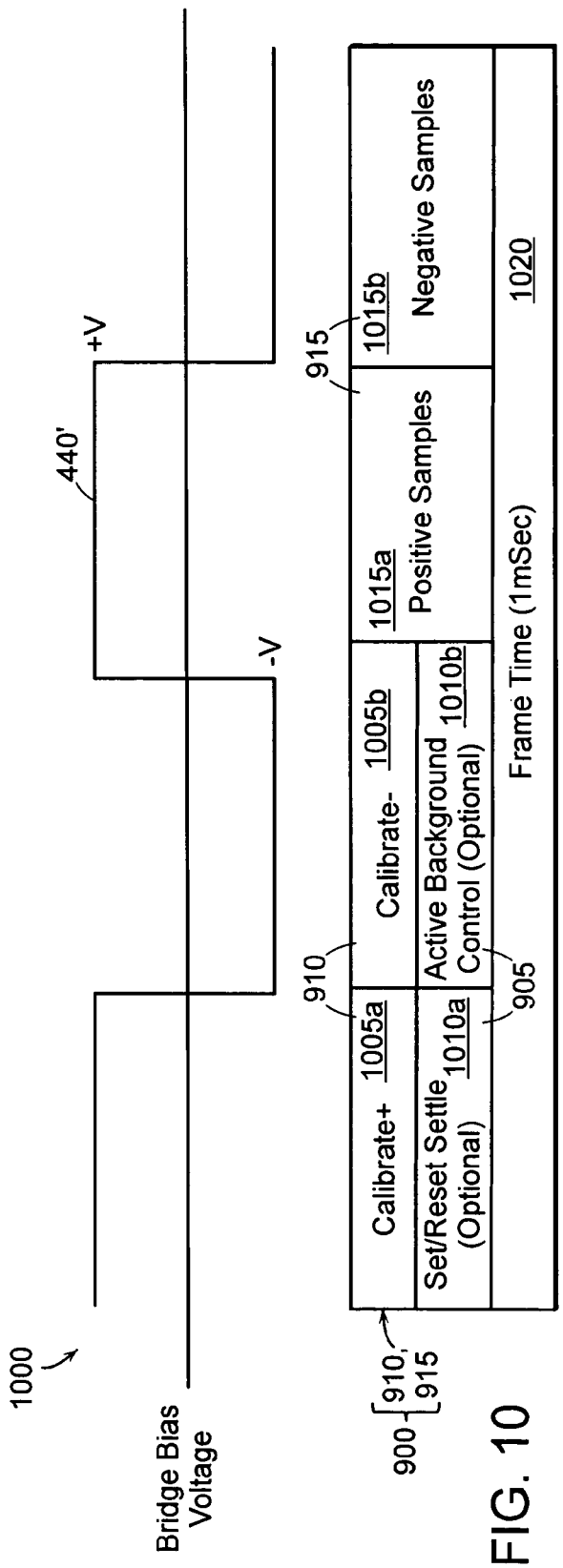

(Top View)

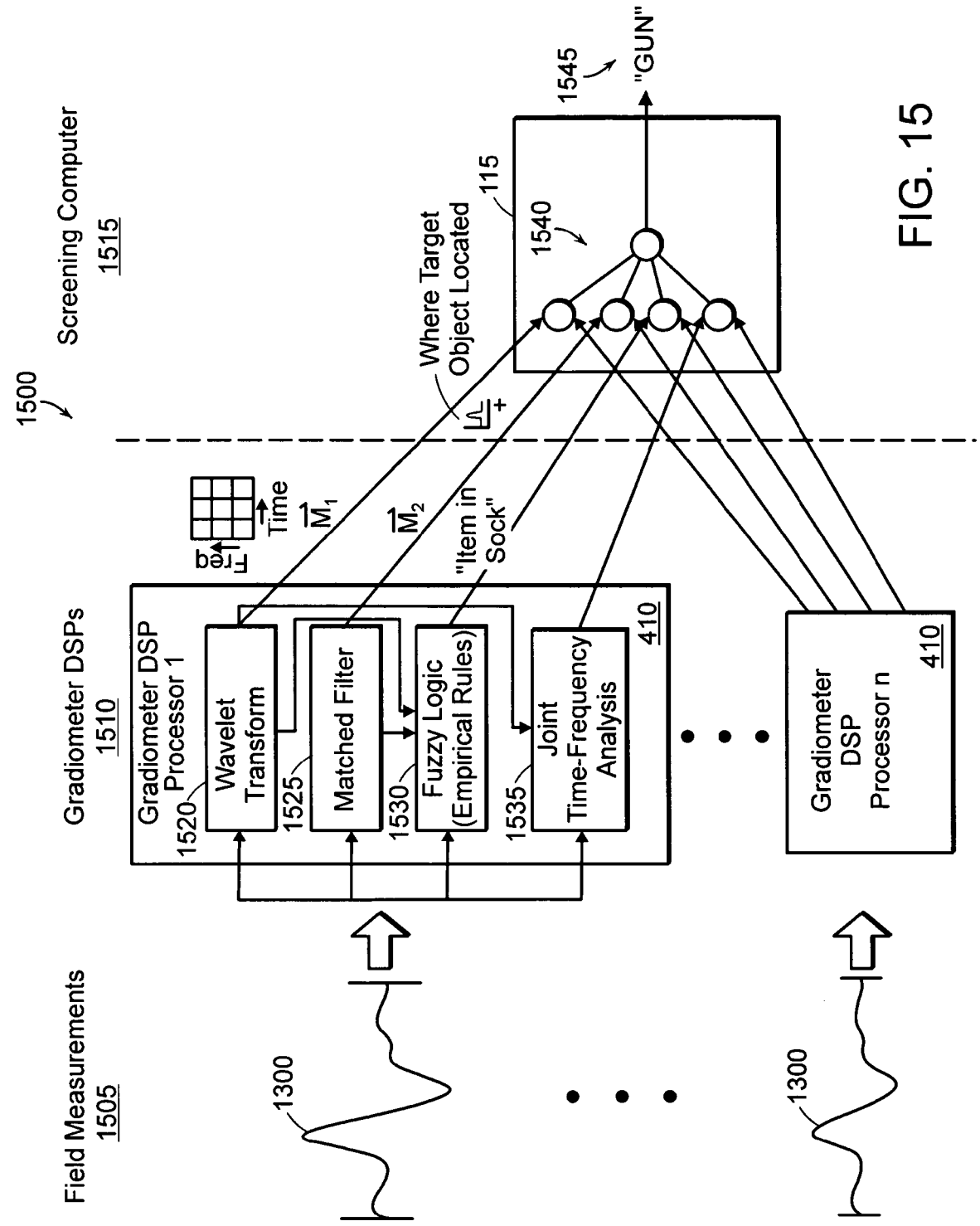

MAGNETIC SCREENING SYSTEM

RELATED APPLICATIONS

This application is a continuation of U.S. application Ser. No. 11/073,424, filed Mar. 4, 2005 now abondoned. The entire teachings of the above application are incorporated herein by reference.

BACKGROUND OF THE INVENTION

In recent years, screening for weapons at entrances of public places, such as airports, government buildings, public schools, and amusement parks, has increased to ensure safety for the public at those places. Screening for weapons can include requiring people entering such public places to pass through a magnetic screening system such as a portal metal detector. Although people have become accustomed to passing through portal metal detectors, the process remains relatively slow for a number of reasons.

One reason for the slow process is that people must empty their pockets of all metallic objects, remove their coats, and sometimes remove their shoes. The objects and clothing are either physically inspected by hand or passed through an x-ray machine for visual screening. Another reason for the slow process is due to false detection or detection of non-weapon metals, such as wrist watches, belt buckles, metallic wires found in ordinary garments, personal adornments such as broaches or hair clips, and loose coins in pockets.

Yet another reason for the slow processing is due to machine settling times, which refers to the amount of time that must be allowed for the sensors in metal detectors to resettle after a person passes through it. Allowing a portal metal detector sufficient time to settle ensures accurate readings of the next person. A person who passes through the portal metal detector then stops on the other side very close to the portal metal detector (i.e., within an 'influence' zone) can also influence the metal detector to such an extent that the metal detector makes a false detection or misses detecting an object as the next person passes through it. Therefore, portal metal detector operators must stop the next person from entering the portal metal detector until the previous person has passed beyond the influence zone.

Typically, all of the delays result in a passthrough rate of between one and two hundred persons per hour. To accommodate large crowds, many portal metal detectors are operated in parallel, which leads to staffing, training, and machine calibration issues. If the passthrough rate were higher, many venues that are currently equipped with large numbers of portal metal detectors could reduce the number in use, and venues such as sports stadiums not currently equipped with portal metal detectors would be so equipped.

Moreover, today's portal metal detectors are sensitive to large ferromagnetic objects, such as wheelchairs. When a person in a wheelchair passes through the portal metal detector, the portal metal detector is overwhelmed by the metal content of the wheelchair and unable to detect relatively small metal objects on the person. In addition, even if the wheelchair is not passing through the portal metal detector, it can influence the detector to such an extent that the detector makes erroneous readings.

In addition to the slow process associated with today's portal metal detectors and their sensitivity to large ferromagnetic objects, many portal metal detectors are 'active,' meaning they emit an electro-magnetic field in a volume of interest (i.e., the area in the portal metal detector). Active detectors can be dangerous for people using medical devices, such as pacemakers, that are sensitive to electromagnetic fields. Passive metal detectors, which sense a local disturbance in the earth's magnetic field, do not affect medical devices, but they are sensitive to local magnetic fields, large ferromagnetic devices, calibration errors, background offsets, and other measurement disturbances known in the art.

SUMMARY OF THE INVENTION

The principles of the present invention apply to multiple levels of a magnetic screening system and a network managing multiple magnetic screening systems. In a network embodiment, signature data ("signatures" or data) of target objects (e.g., guns, knives, cell phones, Personal Digital Assistants (PDA's), and other ferromagnetic materials) and information associated therewith can be added to and maintained in a central signature database. From this central signature database, a management computer can distribute the information and data in the central signature database to magnetic screening systems on the network for updating their local databases. As a result, the local databases can be continually updated, thereby allowing the magnetic screening systems to have knowledge of more target objects than if operating independently off the network for increased automation of detection, identification, or classification processes, among others, of target objects. Increased automation increases a rate of processing of people through the magnetic screening systems because operators of the magnetic screening systems have fewer incidents of having to manually inspect persons carrying target objects.

The magnetic screening systems may include arrangements of gradiometers, each including at least three magnetometers and, in some embodiments, a gradiometer processor in communication with the magnetometers. The gradiometer processor scales outputs from the magnetometers with unequal weights and combines the scaled outputs to orient a direction of sensitivity of the respective gradiometer toward a volume of interest (e.g., a pathway through a portal metal detector). The magnetic screening systems may also include an arrangement in communication with the gradiometer that uses the gradiometers in a collective manner to detect a target object. In addition to detecting a target object, the arrangement processor can localize the position of the target object, identify the target object, and optionally classify the target object. The gradiometers may use passive magnetometers, which do not themselves generate a magnetic field, thereby allowing people with medical devices, such as heart pacemakers, to pass through the magnetic screening system. The arrangement processor may also be used to compare a signature of the target object measured by the gradiometers against known signatures stored in a local or central database.

The gradiometers may be operated in multiple modes. Examples of modes in which the gradiometers may be caused to operate include measurement mode, background offset reduction mode, calibration mode, self-test mode, automatic alignment mode, and diagnostic mode. Self-test mode can be used to determine operational readiness. Automatic alignment mode can be used to calculate the alignment of the gradiometers relative to the earth's magnetic field, which, in turn, can be used to determine orientations of each gradiometer to at least one other gradiometer in the magnetic screening system. Knowing alignment of gradiometers allows for system operation in a tracking mode, in which multiple gradiometers can be configured to generate real-time tracks of target objects in three dimensions. In diagnostic mode, the gradiometers can output measured field strengths in an unaltered state from the component magnetometers. During measurement mode, the gradiometers can be switched from measurement mode to calibration mode or background offset reduction mode in various sequences and at selectable rates. Background offset, caused by disturbances within or outside a volume of interest that affect measurements by the gradiometers, can be reduced in a real-time manner or in a post-processing manner, and the magnetometers can be calibrated before every measurement sample. Use of the above-described modes can yield accuracies that result in minimized rates of false detection of known or unknown target objects, including high accuracy in automatically determining whether a target object is a dangerous object or a non-dangerous object. Thus, processing rates of persons passing through the magnetic screening system(s) is increased.

To increase calibration accuracy, the gradiometers may have individual calibration circuits available for applying localized magnetic fields to transducers in the magnetometers that cause a measurable response by the magnetometer. During a calibration cycle, the calibration circuit may be used to generate magnetic fields at least two different levels. The calibration circuit may be specially designed to limit externally-induced offsets for improved calibration accuracy. Using the calibration circuit, the gradiometer processor or other processor can calculate a calibration curve using various techniques or metrics. The calibration curve can be used to calibrate every magnetic field vector sample measured by the respective magnetometer. This calibration circuit, thus, improves measurement accuracy, which, in turn, reduces rates of false alarm for increased rate of processing persons through the magnetic screening system(s).

As described above, the gradiometers may each include at least three magnetometers whose outputs are scaled with unequal weights. The unequal weights may be combined to orient the direction of sensitivity of the gradiometer toward a volume of interest. In one embodiment, the weights are non-integer weights that may be calculated using a deterministic mathematical technique. In some embodiments, a processor may adjust the output weights digitally and optionally in real-time. Spacing of the magnetometers can improve accuracy of the gradiometers. For example, in the case where the magnetometers are aligned along a single axis, the outer two magnetometers are preferably spaced apart as far as possible for enhanced sensitivity for measuring a magnetic gradient. The magnetometer(s) between the outer two magnetometers may be arbitrarily positioned relative to the outer two magnetometers to orient the direction of sensitivity toward the volume of interest. Optionally, positioning of the magnetometers is determined before the output weights are determined. In some embodiments, the direction of sensitivity is entirely toward the volume of interest, and the sensitivity away from the volume on interest is substantially zero. In such an embodiment, gradiometers positioned on a first boundary of the volume of interest do not detect disturbances behind themselves outside the volume of interest below a selectable threshold, such as a wheelchair or other magnetic screening system. The disturbance outside the volume of interest can be detected by gradiometers on the other side of the volume of interest and, thus, be treated as a background disturbance and eliminated from measurements. Again, such processing techniques and design implementations are used to reduce rates of false detection, improve accuracy, and ultimately lead to increased rate of processing of persons passing through the magnetic screening system(s).

As a result of the multiple aspects of the present invention as described above, a magnetic screening system can process 600-700 persons per hour or more compared to previous systems capable of processing 100-200 persons per hour. Moreover, the magnetic screening systems can make the screening process much more acceptable for people since (i) jackets and other typical outerwear can be worn while passing through the magnetic screening system and (ii) ferromagnetic objects, such as keys, cell phones, personal digital assistants, and other ferromagnetic objects do not have to be removed from pockets as a result of the techniques described herein.

Moreover, in some embodiments, arrangements of gradiometers can be deployed in fixtures other than portals, such as wastebaskets or other common fixtures, so as to be imperceptible to persons passing through a volume of interest defined by placement of the arrangement(s) of gradiometers. Thus, passive metal detection can be done by the magnetic screening systems that do not disrupt traffic flow while yielding high rates of detection of dangerous target objects (e.g., guns, knives, and so forth) and discriminating non-dangerous target objects (e.g., cell phones and the like).

As the magnetic screening system(s) are used, the database of signatures corresponding to known ferromagnetic objects increases and, therefore, improves the overall operation of the system even more over time.

As a result of the improvements described herein, the magnetic screening systems may be employed at venues such as sports stadiums, amusement parks, and other public places in which such systems were previously thought to be too restrictive on a flow-through basis or public relations basis. At venues where magnetic screening systems are currently used in high numbers, such as airports, the number of magnetic screening systems can be reduced.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a timing diagram for multiple modes of operation for the gradiometer of FIG. 8;

FIG. 10 is timing diagram for the system operation diagram of FIG. 9.

FIG. 15 is a block diagram of identification and classification processing used to identify or classify the target object signature of FIG. 13.

DETAILED DESCRIPTION OF THE INVENTION

A description of preferred embodiments of the invention follows.

The principles of the present invention may be employed at multiple levels in the magnetic screening system 100 and a network of magnetic screening systems 100 each including multiple gradiometers. The multiple levels include at least a network level, system level, mode of operation level, and gradiometer design level. A brief overview of each is presented, and details of each, in turn, follows the brief overview.

Figure 1:
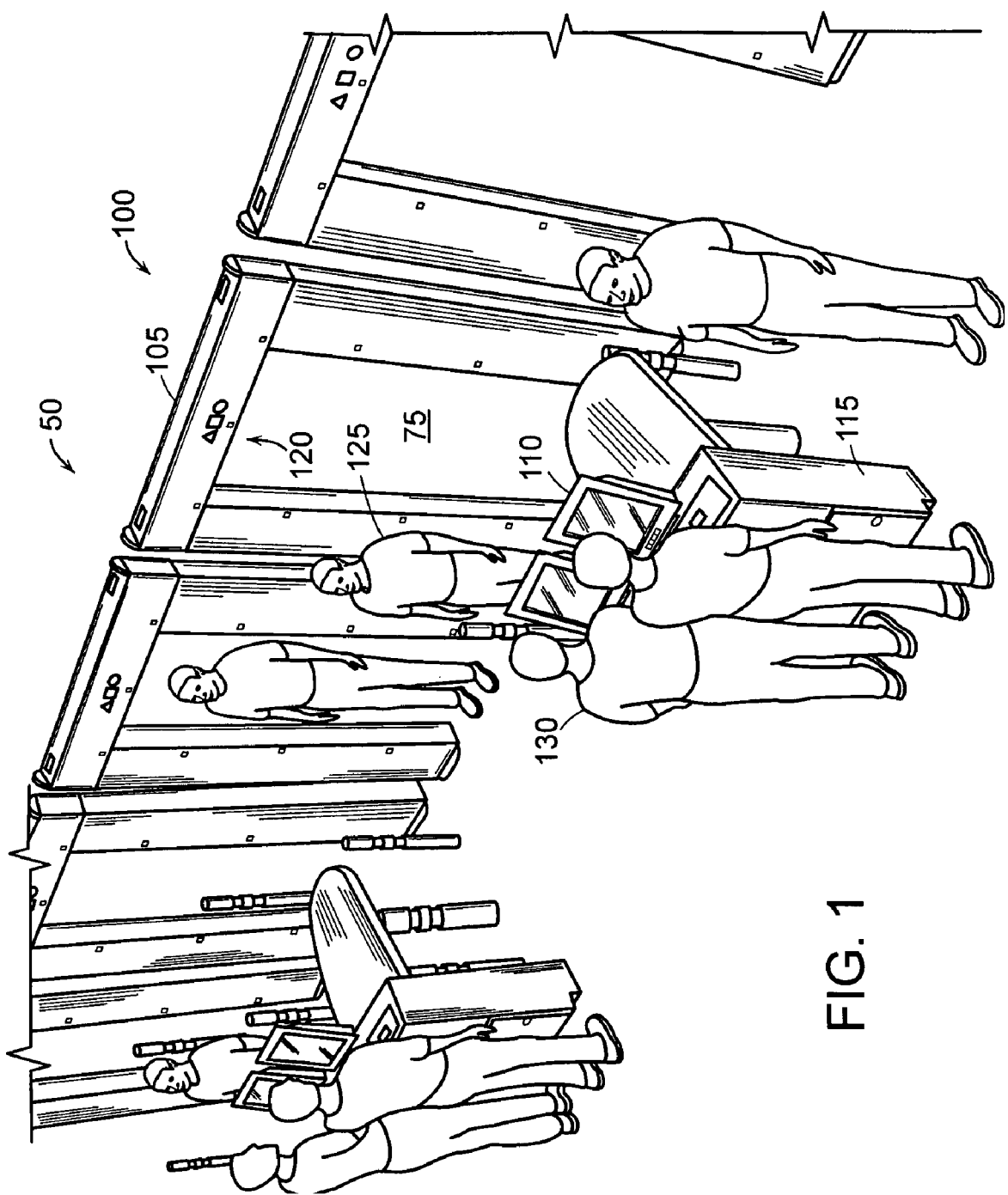
FIG. 1 is a pictorial diagram of an entrance to a public place having magnetic screening systems (e.g., portal metal detectors) employing the principles of multiple aspects of the present invention.

FIG. 1 is a pictorial diagram of a cluster 50 of magnetic screening systems 100, each using gradiometers configured in a portal 105. Magnetic screening systems 100 are typically used at an entrance to a public place, such as an airport, government building, public school, or amusement park. The magnetic screening systems 100 are used to ensure safety for the public. The magnetic screening systems can identify magnetic objects, referred to herein as "target objects" on a person, as understood in the art. In this example embodiment, each magnetic screening system 100 includes the portal 105 (more generally referred to herein as an arrangement of gradiometers), an operator station 110, and a screening computer 115.

A traditional magnetic screening system configured with a portal is capable of processing approximately 100-200 persons per hour. Through use of the principles of one or more aspects of the present invention, the number of persons the portal metal detectors can process increases to between 600 and 700 persons per hour or more. There are many reasons for the increase in processing rate. One reason is that the people passing through the portals 105 do not need to empty their pockets of metal objects. In some embodiments, the portals 105, screening computers 115, operator stations 110 can detect, identify, and classify metal objects being carried by people. For example, processing in the magnetic screening systems 100 can determine that target objects are a cell phone, loose change, brassier underwire, shoe support, wristwatch, hair clip, or other non-dangerous weapon in an automated manner and exclude these objects from causing an alert signal to an operator. Additionally, dangerous weapons, such as knives or guns, can be detected, identified, or classified through use of the processing according to the principles of the present invention.

Another reason for the higher processing rate of people passing through the magnetic screening systems 100 is due to a low rate of false detection. The reason for a low rate of false detection is because the magnetic screening systems 100 can remove background offset before, during, or post measurement acquisition. The magnetic screening systems 100 can also perform calibration during measurement, optionally at a high rate, which improves accuracy of the measurements. Further, because of the removal of background offset from the measurements, persons who dwell in an "influence zone" after passing through the portal metal detector 105 does not adversely affect measurements of the next person to pass through the portal 105.

Another reason for the portal metal detector system 100 is able to perform processing at a higher rate over traditional processing is because it can force resettling of gradiometers in an arrangement of gradiometers that are inside the portal 105. Typical portal metal detectors rely on "drift to zero" for resettling before taking the next measurement without an offset. In the magnetic screening system 100 according to the principles of the present invention, the gradiometers can be driven to their "resettling" state in a forced manner.

Because of the technical advantages provided by the principles of the present invention, the magnetic screening systems 100 can process a single person or multiple persons passing through at the same time, which can save a tremendous amount of time. It should be noted that the 600-700 person per hour processing rate does not include the additional gain of having multiple persons pass through the portal 105, for example, at the same time.

Also, because of the ability to reduce offset, large ferromagnetic sources of disturbances are allowed to pass through the portal 105 that are typically unable to pass through portal metal detectors. For example, wheelchairs can pass through without deleterious effect on the performance of the magnetic screening system 100. This ability to process wheelchairs includes an ability to allow the wheelchair to pass through the portal 105 or be nearby or within a given area inside a volume of interest 75 defined by the portal 105.

In addition, the gradiometers used by the magnetic screening system 100 inside the portal 105 are electromagnetically passive. This means that they do not project magnetic fields which are known to cause problems for persons using medical equipment that is sensitive to magnetic fields, such as a cardiac pacemaker. Other sensitive electronic equipment is also be able to pass through without any adverse effect since the gradiometers can be passive gradiometers.

At the network level, a management computer stores information and data common to all magnetic screening systems. The management computer may have or receive common information and data from clusters or individual magnetic screening systems and share the stored information or data with other clusters or individual magnetic screening systems via a communications network, such as the Internet. An example of data stored in the common database is signature data for target objects, which can be any ferromagnetic objects (e.g., gun, knife, cell phone, keys). An example of information stored in the database includes an indicator (e.g., graphic or photograph of a gun) or description associated with the signature.

At the system level, the principles of the present invention may be used to detect, identify, or classify ferromagnetic objects through use of an arrangement of gradiometers (i.e., magnetic sensors). The architecture of the magnetic screening systems allows their response to a particular set of target objects to be tailored in accordance with sets of target objects that operators choose to include or exclude. These target objects may be objects that are threats to safety, such as guns and knives, or any other ferromagnetic object that may pose a risk of injury. The magnetic screening system may use a variety of signal processing techniques in combination to detect, localize, identify, or classify the ferromagnetic objects. The technique for detecting the ferromagnetic objects may be completely electromagnetically passive, in contrast to similar devices that generate an active magnetic field.

At the mode of operation level, each gradiometer utilizes at least three vector magnetometers of any underlying technology to measure a magnetic field gradient. Typically, the magnetic field being measured is the earth's magnetic field, but may be a different, man-made or biologic magnetic field, such as found in medical applications. The multi-modal gradiometer includes signals and processing methods to provide high rate, high dynamic range signals. The multi-modal gradiometers include modes, such as measurement mode, automatic offset reduction mode, calibration mode, tracking mode, self-test mode, automatic alignment mode, and diagnostic mode, and may also include a method to eliminate hysteresis in the measurements.

At the gradiometer design level, the principles of the present invention optimize a response of the gradiometers. In particular, the principles of the present invention relate to a method and corresponding apparatus for optimizing near and far field responses of a plurality of vector magnetometers in the gradiometers so as create a field response pattern optimized for a particular sensing application. The method utilizes the individual magnetometers applied in a certain arrangement to shape the field response. Additionally, data from magnetometers in the preferred arrangement is processed so as to enhance shaping of the field response pattern. In particular, the field response pattern can be used to reduce effects of extraneous and background signals that may be undesirable or overwhelming to the signal of interest.

The description that follows provides details of the multiple aspects of the principles of the present invention.

The magnetic screening system 100 detects, selectively identifies, localizes, or excludes an item from a volume of interest. This is accomplished by utilizing an arrangement of high-order magnetic gradiometers (i.e., at least three magnetometers 400) used in a collective manner combined with global processing of all the arrangement elements to detect, localize, or identify the target objects. In other embodiments, a gradiometer may include one or two magnetometers, and processing may allow an arrangement of gradiometers to be used as described in reference to gradiometers with three magnetometers or a reduced set of processing may be employed for more limited detection of target objects. The detection method may be entirely electromagnetically passive.

One advantage resulting from the use of high order gradiometers is that the effect of nearby 'hard iron' and moving ferromagnetic objects can be suppressed. The use of a totally passive sensor system allows for discreet screening of a volume of interest without the knowledge of the person or persons passing through the volume of interest. The passive embodiment of the magnetic screening system also eliminates a possibility of interference with life sustaining devices, such as cardiac pacemakers, and does not interfere with the operation of personal electronic devices, such as cell phones. Another advantage of this aspect of the present invention is that signal processing elements tasked with processing measurements by the gradiometers can be remotely located anywhere there is a suitable communications connection, preferably digital, to the arrangements of gradiometers.

An apparatus embodiment comprises arrays of high order magnetic gradiometers located near to or remote from a signal-processing element. The signal-processing element may control and process a single gradiometer or arrangement or a number of gradiometer arrangements.

In use, a preferred embodiment of the system level aspect of the present invention is operated by a central workstation, where an operator can respond to automatic announcements the system generates. This workstation may be physically attached to the array(s), co-located with the array(s), or located remotely from the array(s).

In broad terms, a preferred embodiment of the system may be implemented in the form of a plurality of arrangements of gradiometers located at a controlled location (e.g., airport) having at least one volume of interest connected to an operator workstation or workstations. A signal-processing element is co-located with each of the arrangements of gradiometers to provide detection, location, or classification of target objects.

In broad terms, an embodiment of a signal processing method according to a system level aspect of the invention includes the following steps:

1. The arrangement of gradiometers, when operating, collects data from each of the gradiometers by converting analog field gradient measurements into a digital measurement utilizing an Analog-to-Digital (A/D) converter. The digital field gradient measurements are sampled at a rate greater than 100 Hz or more preferably greater than 1 kilohertz to maintain the frequency content of the sampled signals. The measurement sampling occurs when the gradiometer array has been turned on to begin a sampling event.

2. The data from each magnetic gradiometer is processed to improve Signal-to-Noise Ratio (SNR) by successively applying a frequency-enhancing filter and then an optional matched signal filter. The matched signal filter may include a filtering window of a magnetic dipole moment. The data may also be normalized to provide a uniform number of samples for succeeding stages of signal processing.

3. After the SNR enhancement and filtering is performed, the data set from a gradiometer is then processed for determination of magnetic features. The magnetic features may include magnitude, phase, and timing relationships, along with frequency spectra or other fundamental signal characteristics well known in the art. The collected data represents a time phased scan of an object as it passes by the arrangement of gradiometers. Conversely, a fixed test volume may be scanned by moving the arrangement of gradiometers past the volume of interest without any loss of generality of the technical features disclosed herein.

4. Once each magnetic field reading has been processed at the gradiometer level, each gradiometer in the arrangement presents its results and/or raw data to a collection processor. The collection processor may first perform a quality check on the data. At this point, the collection processor utilizes the data from all the gradiometers in the arrangement to develop an estimate of the locations, magnitudes, and dipole moments of any objects passing a threshold for magnitude. The combined data from the arrangement of gradiometers are averaged to provide a measure of the integrated background. The measured background is subtracted from each gradiometer's raw data so as to leave only disturbance data for further processing. The collection processor also coordinates timing of the data collection across multiple arrangements of gradiometers (e.g., multiple portal metal detectors) and provides a communications node for the arrangements of gradiometers to communicate with each other or share data or other information (e.g., photographs corresponding to data).

5. The collection processor may utilize all of the gradiometer data collected to extract further features related to position, magnitudes, or phases of target objects detected.

6. This data set for the collection event is packaged and forwarded to a computing element dedicated to detection, analysis, or classification of the target object.

7. The signature data collected may be processed through a plurality of independent processing techniques. A preferred embodiment utilizes matched filtering, wavelet decomposition, and soft polynomial decision space boundaries. The results of the individual classifications may be forwarded to a meta-classifier, where, in one embodiment, a polynomial Bayesian or other suitable classifier combines the results to determine a "best" estimate of the target object's position and classification. Other meta-classifiers, such as artificial neural networks, may be used for the final classification step.

8. Once the target object is classified, the results are returned to the operator and optionally transmitted via wire or wireless network for notifying other systems or personnel. The results may be graphically displayed on an operator interface, or otherwise announced to the operator for initiating action. Additionally, the results may be used to control the state of the array of gradiometers to prevent further screening from taking place unless the event is deemed benign.

Figure 2:
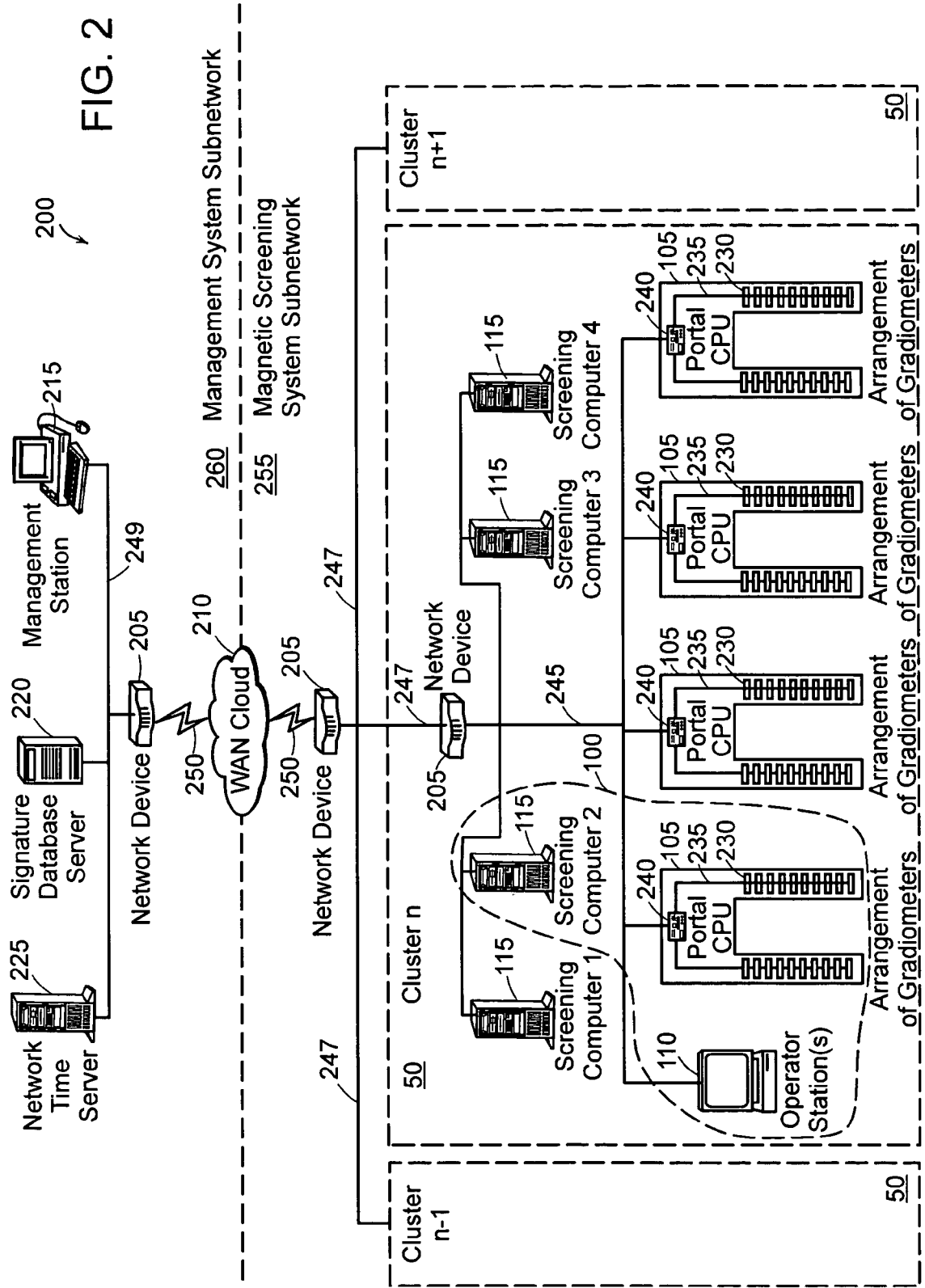
FIG. 2 is a network diagram of a magnetic screening system network including the magnetic screening systems of FIG. 1.

FIG. 2 is a network diagram of a magnetic screening system network 200 that includes a magnetic screening system subnetwork 255 and a management system subnetwork 260. The magnetic screening system subnetwork 255 includes multiple clusters 50 of magnetic screening systems 100. In one embodiment, the management system subnetwork 260 includes a management station 215, signature database server 220, and network time server 225.

The magnetic screening system 100 includes respective arrangements of gradiometers 230 and an arrangement processor, also referred to herein as a portal Central Processing Unit (CPU) 240. In the embodiment of FIG. 2, the arrangements of gradiometers 230 are configured in frames defining the portals 105. The gradiometers 230 and arrangement processor 240 communicate with each other via an intra-portal communications bus 235. Any standard or application-specific communications protocol may be used for communications over the intra-portal communications bus 235.

The portal CPUs 240 can communicate with one another and the operator station(s) 110 via an inter-portal communications bus 245. The screening computers 115 communicate with the portal CPUs 240 and operator station(s) 110 via the inter-portal communications bus 245. It should be understood that one or more inter-portal communications buses 245 may be used with one or more communications protocols in any combination. Further, the inter-portal communications buses 245 may be wire, wireless, or fiber optic with associated network interface support hardware and software.

A network device 205, such as a router, may also be connected to the inter-portal communications bus 245 within the cluster 50 of magnetic screening systems 100. The network device 205 provides communications services for the operator station(s) 110 or other processor in the cluster 50 to communicate with other clusters 50 in the magnetic screening system subsystem 255 via an inter-cluster bus 247 using an appropriate protocol. The inter-cluster communications bus 247 may be wired, wireless, or optical.

The magnetic screening system subnetwork 255 may communicate with the management system subnetwork 260 via a wide area network (WAN) 210, such as the Internet. On each side of the WAN 210 is a network device 205 that communicates over a WAN communications bus 250. The WAN communications bus 250 may use an Internet Protocol (IP) communications protocol, Voice-Over-IP (VoIP) communications protocol, or any other suitable protocol for communicating information or measurement data between the magnetic screening system clusters 50 and the computing devices 215, 220, or 225 in the management system subnetwork 260 over a management system bus 249. It should be understood that the WAN 210 may include packet switched or circuit switched networks using associated communications protocols.

Within the management system subnetwork 260, the management station 215 provides many services. First, the management station 215 provides high-level communications with the operator stations 110. Second, the management station 215 may provide high level processing, such as analysis on information or data captured by one or more magnetic screening systems 100. Third, the management station 215 maintains a central database (not shown) of signatures of target objects measured in a controlled environment or measured by a magnetic screening system 100 in the field. The signatures may be maintained in the signature database server 220 or other server(s). Fourth, the management station 215 may assist in uploading and downloading database of target object signatures from and to the operator stations 110. The uploading and downloading processes allows the magnetic screening systems 100 to share signature measurements of target objects stored in their local databases (not shown) and use all the signatures in the central database stored in the signature database server 220 for field measurements.

The network time server 225 provides a means of synchronizing and tagging screening events in a uniform fashion across all the elements of the system. The preferred embodiment of the system provides for the common time base across all elements to produce more value in the records of incidents and signatures gathered during operation. The network time server is not required for the system to operate in other embodiments.

Figure 3:
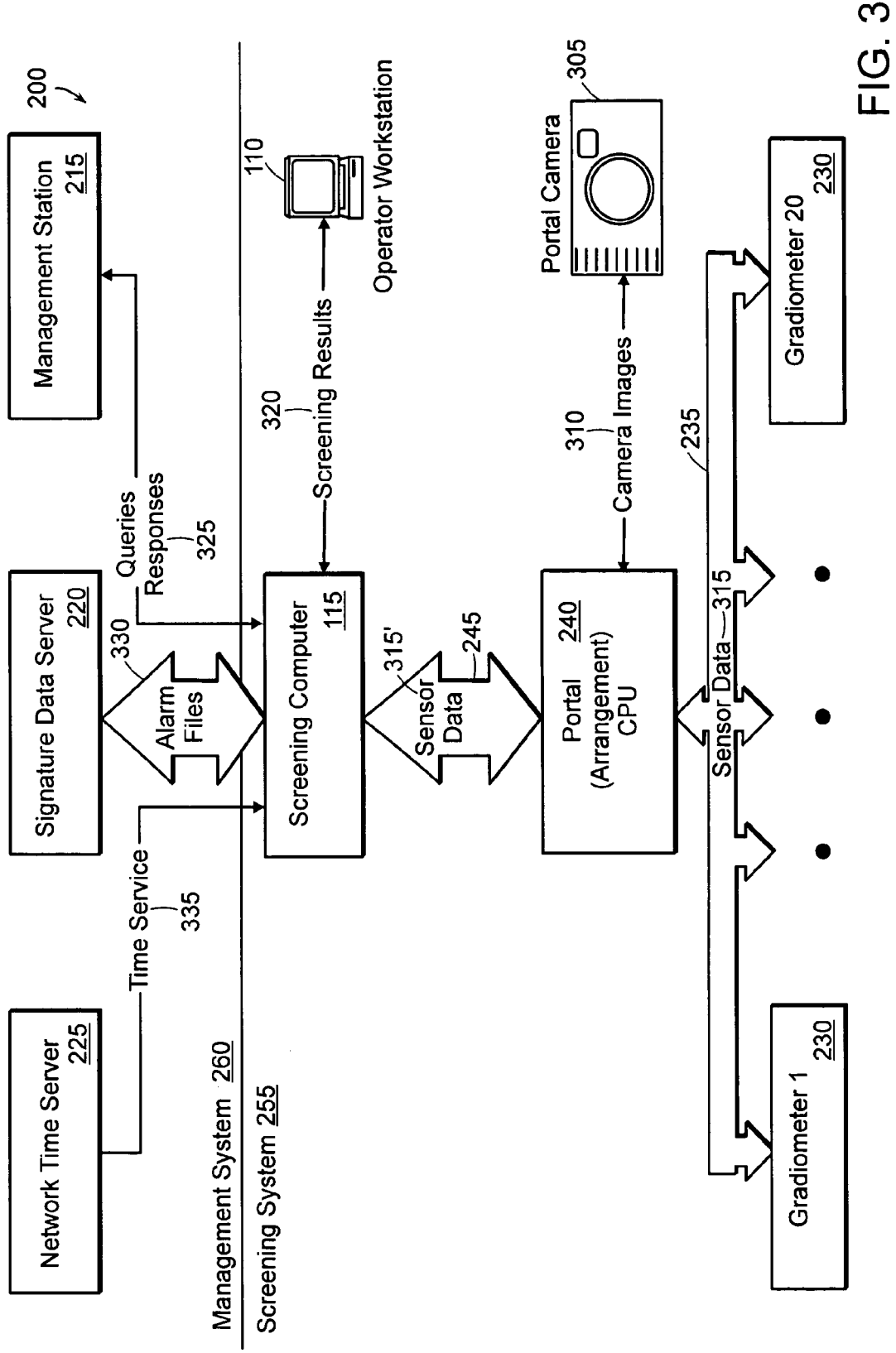
FIG. 3 is a network block diagram corresponding to a subset of the network of FIG. 2.

FIG. 3 is a block diagram of the magnetic screening system network 200 of FIG. 2 with indications of signals on the data buses. Starting at the gradiometers 230, the intra-portal communications bus 235 carries sensor data 315 from the gradiometers 230 to the portal CPU 240. A portal camera 305 may be employed at a magnetic screening system 100 and transmit camera images 310 to the portal CPU 240. The camera images 310 may be images of people passing through the respective portal metal detector 105. The portal CPU 240 may associate the camera images 310 with respective target object signatures measured for use in later identification of persons carrying a suspected dangerous target object.

The portal CPU 240 sends the sensor data 315, possibly in a processed form 315', via the inter-portal communications bus 245 to the screening computer 115 optionally with the camera images 310. The screening computer 115 forwards screening results 320 to the operator workstation 110 for providing an indication of whether or not the person passing through the portal 105 of the magnetic screening system 100 is carrying a target object. The screening computer 115 may provide the screening results 320 in the form of signature data, identity of the target object (e.g., gun, knife, cell phone, keys), or classification of the target object (e.g., dangerous object, non-dangerous object, unknown object).

In this embodiment, the screening computer 115 also communicates with the management station 215 via the network paths 245, 247, 249, 250 described above. On the network paths, the screening computer 115 and management station 215 communicate queries and responses 325 and optionally other information or data. The screening computer 115 may communicate alarm files 330 and related information or data with the signature data server 220. The screening computer also communicates time service 335 with the network time server 225.

It should be understood that the embodiments of FIGS. 2 and 3 are merely examples of possible configurations of processing associated with arrangements of gradiometers 230. For example, the portal CPU 240, screening computer 115, and operator workstation 110 may be combined into a single computer system. Similarly, the management station 215, signature data server 220, and network time server 225 may also be combined into a single computer system. In addition, the portal 105 in FIGS. 1 and 2 include gradiometers 230 arranged in two vertical columns or arrays.

It should be understood that the gradiometers 230 may be configured in any other arrangement(s) that defines at least one boundary of a volume of interest, e.g., a pathway through which a person walks to be screened for target objects. For example, an arrangement of gradiometers 230 may define one boundary of a volume of interest and a wall or fixture can define a second boundary of the volume of interest, where the first and second boundaries define a pathway. For example, in one embodiment, one vertical column of the portal 105 is populated with gradiometers 230. In another embodiment, a single gradiometer may define a boundary and in a manner similar to other arrangements of gradiometers 230 may be used to take measurements.

Figure 4A:
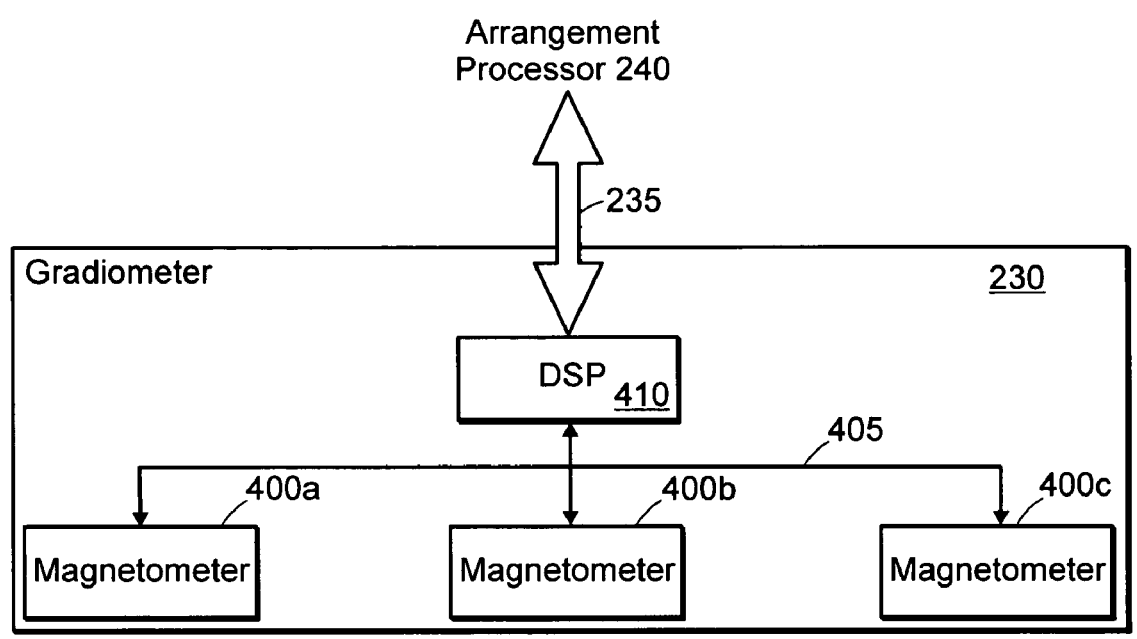
FIG. 4A is a block diagram of a gradiometer used in the magnetic screening systems of FIG. 1.

FIG. 4A is a block diagram of an individual gradiometer 230. In one embodiment, the gradiometer 230 includes a processor 410, such as a digital signal processor (DSP), to communicate with at least three magnetometers 400a, 400b, and 400c (collectively 400) using an intra-gradiometer bus 230. The gradiometer DSP 410 also communicates with the arrangement processor 240 over the intra-portal bus 235.

The processor 410 may be analog, substantially digital, or completely digital depending on various factors for design implementation. It should be understood that supporting circuitry (not shown) which allows the gradiometer processor 410 to communicate with the magnetometers 400, may also be employed. Examples of other circuitry include memory, registers, analog circuits, or supporting processors. Further, the gradiometer processor 410 may include multiple gradiometer processors 410 for parallel processing purposes.

In addition to a uniaxial layout of the magnetometers 400, the magnetometers may also be positioned offset in one or more axes from each other for purposes of achieving particular orientations of sensitivity for the gradiometer 230.

In other embodiments, the gradiometers 230 in an arrangement may not have an "on-board" processor 410. In such a case, the arrangement processor 240 performs functions described herein in reference to the gradiometer processor 410.

Figure 4B:
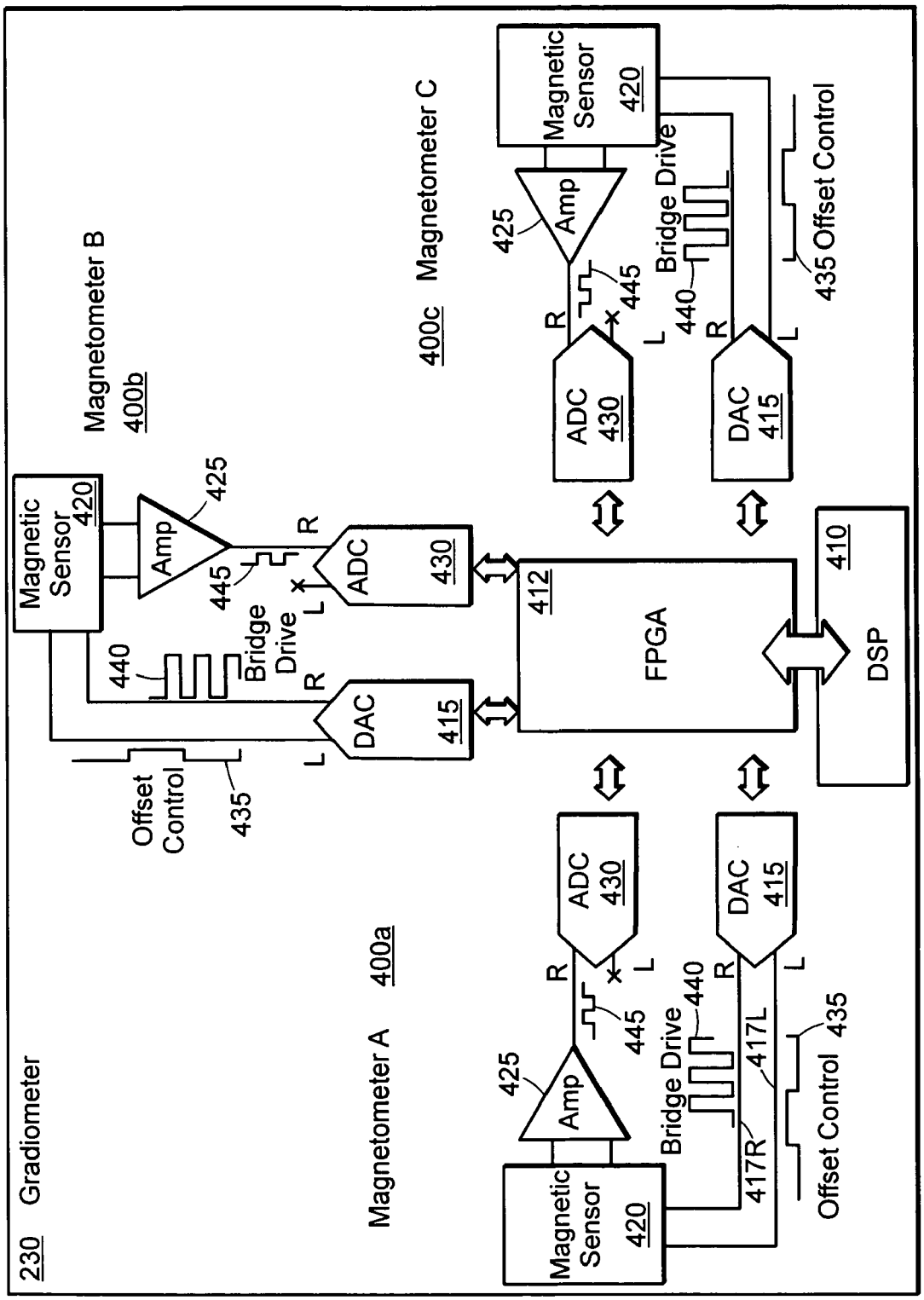
FIG. 4B is an electrical schematic diagram of the gradiometer of FIG. 4A.

FIG. 4B is a electrical schematic diagram of an example embodiment of the gradiometer 230. The gradiometer processor 410 communicates with a field programmable gate array (FPGA) 412, which, in turn, communicates with the magnetometers 400.

Each magnetometer 400 in this embodiment includes the same circuitry, so the following description applies to each of the magnetometers 400. At the front end of the magnetometers 400 is a digital-to-analog converter (DAC) 415. In one embodiment, the DAC 415 includes a left (L) output channel 417L and a right (R) output channel 417R (collectively 417). Both of the output channels 417 connect to an input of a magnetic sensor 420, which senses a gradient in a magnetic field. The output of the magnetic sensor 420 is connected to an amplifier 425, such as a sense amplifier capable of amplifying very low level voltages without adding significant noise in the amplifying process. The output of the amplifier 425 is an analog-to-digital converter (ADC) 430. The ADC 430 provides a digital output to the FPGA 412, which, in turn, provides a digital signal to the gradiometer processor 410.

In operation, the gradiometer processor 410 issues a command signal to the FPGA 412 for commanding one or more of the magnetometers 400. The command signals output by the processor 410 may correspond to a mode of operation of the gradiometer 230, including measurement mode, background offset reduction mode, calibration mode, self-test mode, automatic alignment mode, diagnostic mode, or tracking mode. These modes are described in detail below beginning in reference to Table I and FIG. 9.

The FPGA 412 transmits the command received from the processor 410 to the corresponding magnetometer(s) 400. As illustrated, an offset control signal 435 output by the left channel 417L of the DAC 415 indicates that the processor 410 is commanding the magnetometers 400 to operate at least part time in background offset reduction mode. As also illustrated, a bridge drive signal 440 output by the right channel 417R of the DAC 415 indicates that the processor 410 is commanding the magnetometers 400 to operate at least part time in measurement mode or another mode that causes the magnetic sensor 420 to take measurements. For example, both signals 435 and 440 are used during background offset reduction mode since one portion of the mode is a measurement period (bridge drive signal 440) of a background disturbance causing a magnetic offset of the magnetometer 400, and another portion of the background offset reduction mode is an offset reduction period (offset control signal 435). Further discussion of the background offset reduction mode and other modes is presented below in reference to FIGS. 9 through 12C.

Figure 5:
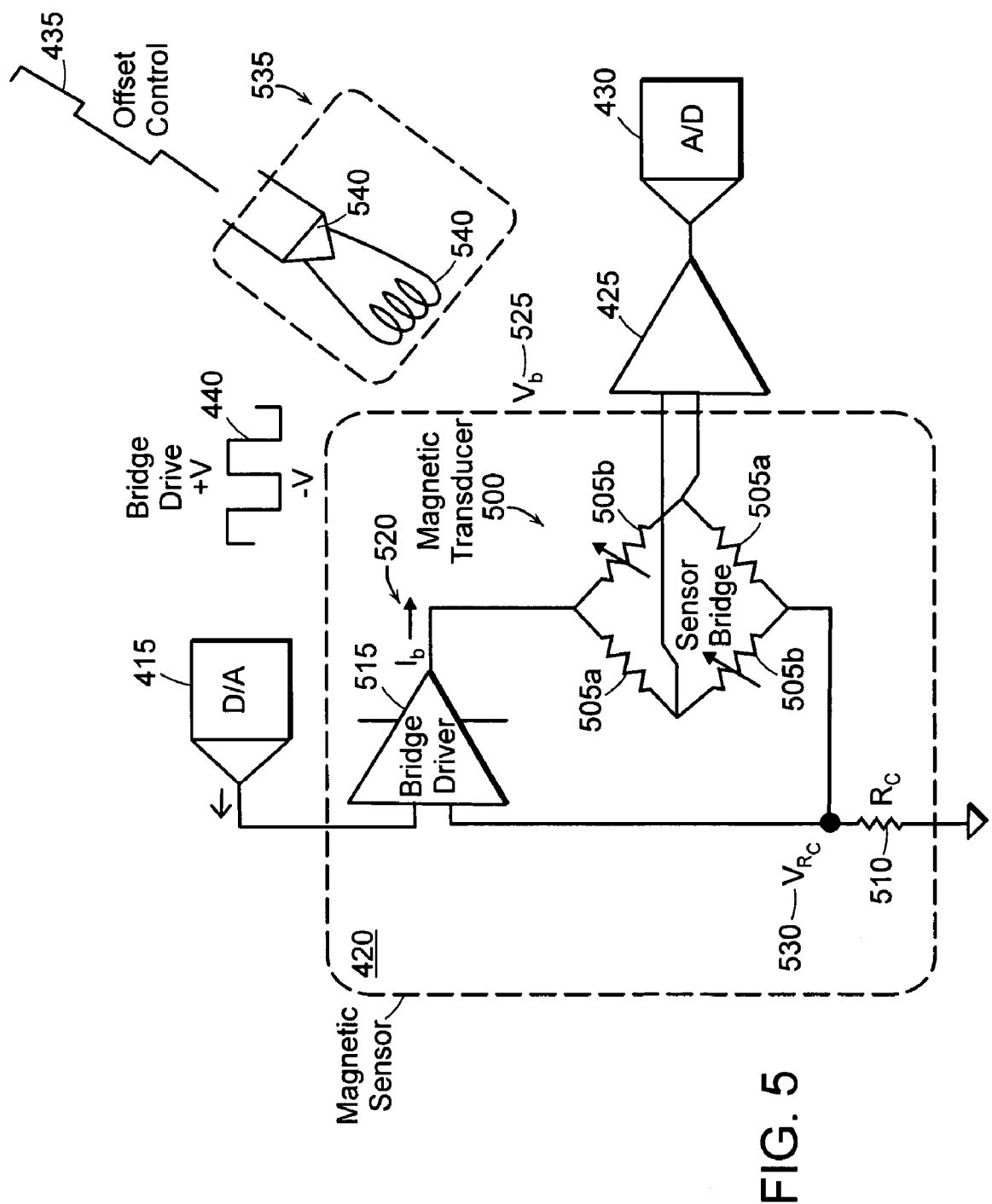
FIG. 5 is an electrical schematic diagram of a magnetometer with transducer used in the gradiometer of FIG. 4B.

FIG. 5 is a detailed electrical schematic diagram of the magnetometers 400 of FIG. 4. In this embodiment, the magnetic sensor 420 includes a magnetic transducer 500, which is in the form of a traditional Wheatstone bridge. The transducer 500 includes two legs of static elements 505a and two legs of variable elements 505b. In the case of a magnetic transducer, the static elements 505a and variable elements 505b are the same elements, but a magnetic shielding is placed over the static elements so that external magnetic disturbances influences only affect the unshielded variable elements 505b. The type and arrangement of the variable elements of the magnetometer is not material to the operation of the gradiometer. In other embodiments, the magnetometer bridge may have one or multiple active sensing elements. Such other arrangements are well known to practitioners of the art in magnetometers.

In operation, the DAC 415 presents the bridge drive signal 440 to a bridge driver amplifier 515, which may produce a bridge drive current 520 whose level is set, in part, by a compensation resistor 510 providing a voltage VRC at a junction with the bridge driver 515 negative input. The bridge driver 515 can then correct error in the bridge drive current 520. Thus, the transducer 500 produces a differential voltage output Vb 525 that is amplified by the amplifier 425 whose output is sampled by the ADC 430.

The offset control signal 435 is presented to an offset control circuit 535, which includes a drive amplifier 540 and magnetic field generator 540 for producing a magnetic field that drives offset of the magnetic transducer 500 to a "reduced" state. The reduced state is a state in which background offset caused by large ferromagnetic elements in the volume of interest or within a zone of influence of the gradiometer is cancelled from the magnetic transducer 500 (i.e., background offset reduction mode).

It should be understood that the magnetic transducer 500 may be other forms of magnetic transducers known in the art adapted to detect magnetic fields as described herein. For example, the magnetic field may be the earth's magnetic field (~45,000 nTeslas) and fields of target objects (100 nTeslas or less). The magnetic fields may also be much larger, as in the case of medical sensing applications. Therefore, the offset control circuit 535 is preferably capable of producing a magnetic field over a wide range or the offset control circuit 535 is specially designed for particular sets of applications.

Figure 6A:
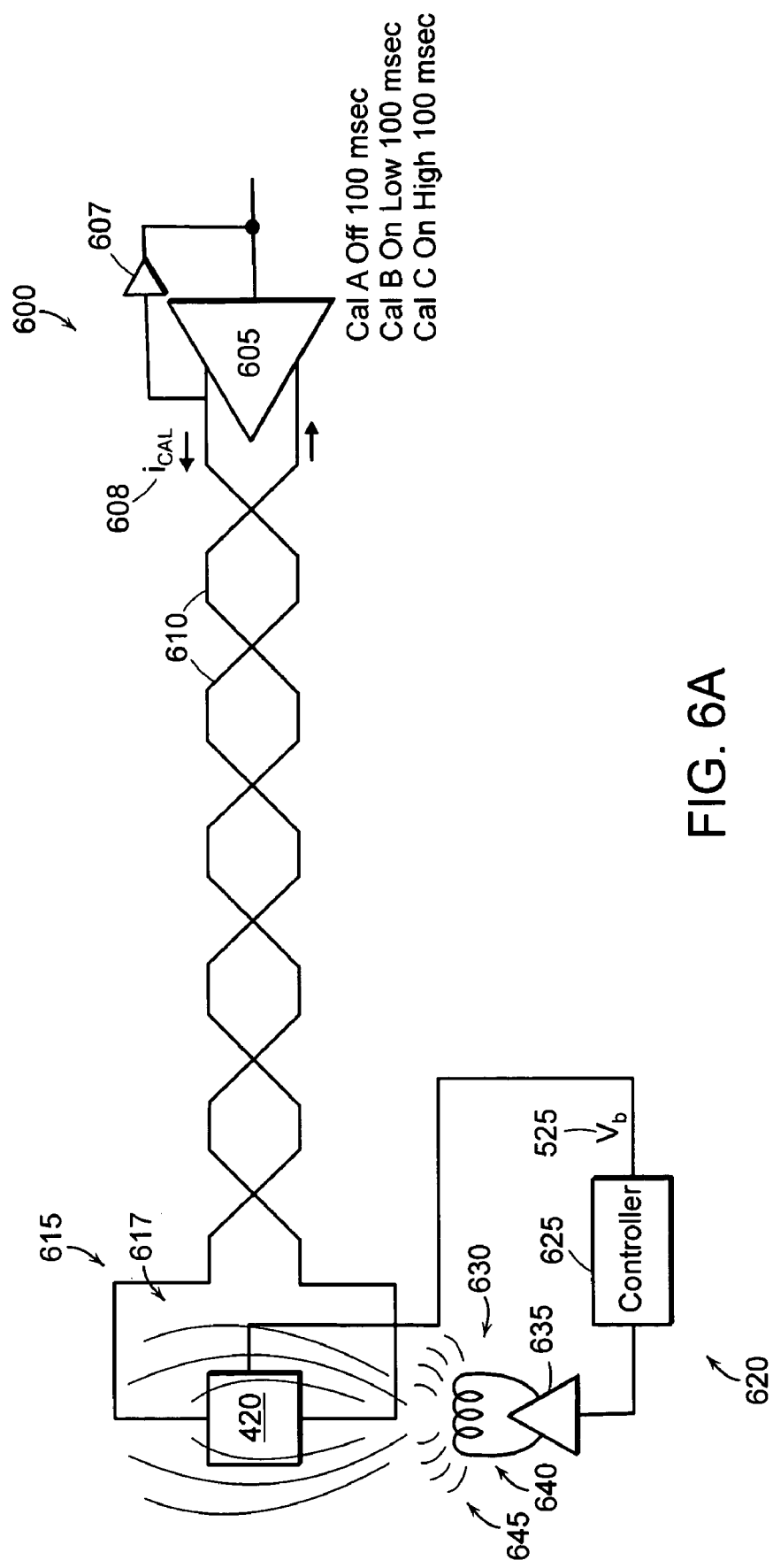
FIG. 6A is an electrical schematic diagram of the transducer of FIG. 5 and an associated calibration circuit.

FIG. 6A is an electrical schematic diagram of a calibration circuit 600 that may be used to calibrate the magnetic sensors 420 in the magnetometers 400. The calibration circuit 600 includes a precision current source 605 with feedback circuit 607 to produce a precision calibration drive current 608. The precision calibration drive current 608 travels on a pair of crossing traces 610 to a magnetic field generator 615, which may be a simple wire loop or more complex magnetic field generator 615. The magnetic field generator 615 produces a precise, known, calibration magnetic field 617 in magnetic relationship with the magnetic sensor 420 of the magnetometer 400 and causes a measurable response by the magnetometer 400. The output Vb 525 of the magnetic sensor 420 may be fed to a controller 625, which drives an offset correction drive circuit 635 and magnetic field generator 640 for producing an offset correction magnetic field 645 for correcting the offset caused by the calibration circuit 600.

The offset correction circuitry 635, 640 may be the offset control circuit 535 used for calibration in this case, or may be a separate circuit. In either case, any number of signals used to correct for the measured response of the magnetometer 400 can be used as a calibration metric, which may be scaled or offset in real-time or post-processing.

The controller 625 may be an analog controller or a digital controller. In the case of a digital controller, it may be implemented in the gradiometer processor 410 or in a separate digital processor. In either of the digital processor cases, the magnetic sensor output Vb 525 is a sampled form provided by the ADC 430 that is sampled according to techniques well known in the art. Further, the controller 625 may use any applicable control law, such as a proportional, integral, differential (PID) control law. Since digital controllers can be updated in software, the controller 625 is preferably a digital controller.

Continuing to refer to FIG. 6A, a calibration cycle includes measurements of at least three calibration points in one embodiment. A timing sequence is listed at the input to the calibration precision current source 605. A first calibration point (Cal A) does not use the current source 605 to produce a drive current 608. Instead, the first calibration point is a measure of the magnetometer 400 immediately after background offset reduction mode has removed offset from the magnetometers 400 and calibration measurements of Vb 525 are taken and averaged over 100 msec, for example. A second calibration point (Cal B) applies a low level voltage to the current source 605 to produce a low level drive current 608 for 100 msec, for example, during which measurements are taken and averaged. A third calibration point (Cal C) applies a high level voltage to the current source 605 to produce a high level drive current 608 for 100 msec, for example, during which measurements are taken and averaged.

Figure 6B:
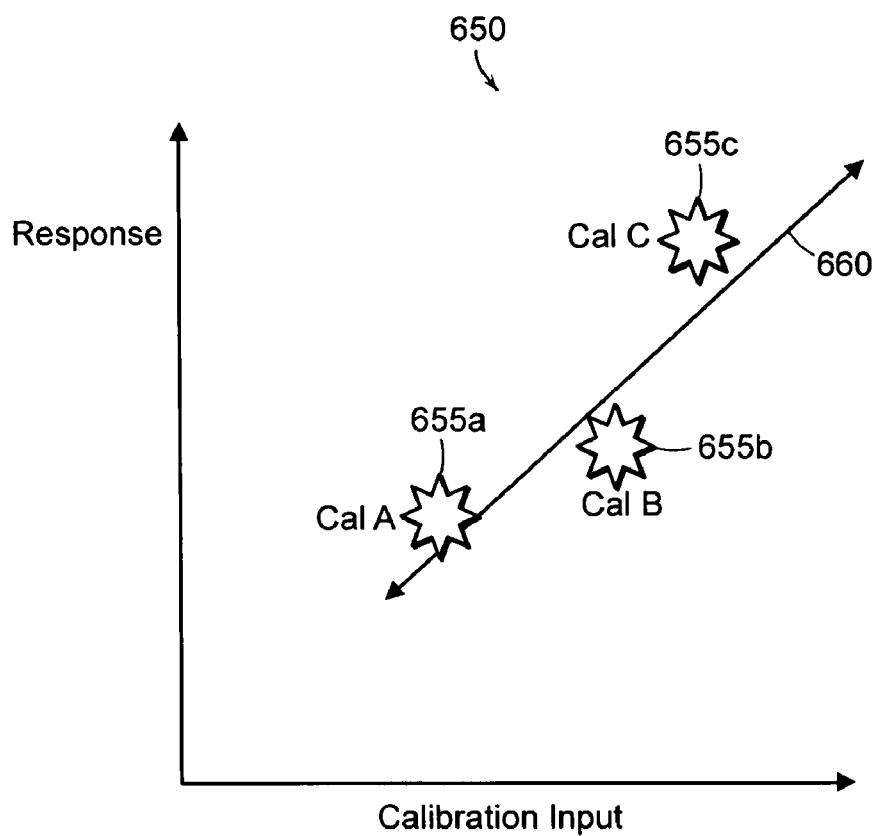
FIG. 6B is a plot of data points captured by a calibration process using the calibration circuit of FIG. 6A.

FIG. 6B is a plot 650 of results of the calibration measurements based on the example calibration cycle just described. The plot includes three points, 655a, 655b, and 655c corresponding to calibration points, Cal A, Cal B, and Cal C. A linear fit, polynomial fit, or other suitable technique may be employed to determine a calibration curve 660. The gradiometer processor 410 uses the calibration curve 660 to improve accuracy of measurements of gradient magnetic fields by the magnetometers 400 in a manner well known in the art.

At the gradiometer design level, the principles of the present invention provide a method or corresponding apparatus to arrange and process signals from an array of multiple magnetic sensing devices (e.g., gradiometers) to control near and far field responses of the arrangement. The arrangement may then be used to sense signals (e.g., local disturbances in the earth's magnetic field), which are near the magnetic sensing devices in a volume of interest, while excluding signals that are in a particular direction away from the volume of interest.

One advantage of this aspect of the present invention is that the user of the magnetic sensing device does not need to shield or otherwise prevent extraneous signals from interfering in the measurement of the desired signals or target objects. By improving the directionality of the magnetic sensing device, expense and complexity of otherwise eliminating external signals or sources of interference is saved.

Another advantage of this aspect of the present invention is that the improved directionality of the magnetic sensing device allows the usage of the magnetic sensing device in an area otherwise unsuitable for magnetic measurements. This is accomplished by automatically excluding background signals normally encountered during measurement, such as signals from light fixtures, power lines, and ferromagnetic objects in close proximity to the magnetic sensing device.

The principles of this aspect of the present invention may be implemented in the form of a plurality of magnetic sensors, such as vector magnetometers, to form a gradiometer. A preferred embodiment of the gradiometer does not require a specific number of magnetometers or a specific technology of magnetometers. Using the technique described herein can optimize the gradiometers.

The magnetometers may be Superconductivity Quantum Interfering Devices (SQUID), Anisotropic Magnetoresistive (AMR) or Giant Magnetoresistive (GMR) sensors, spin tunneling devices, or simply a wire loop or solenoid for the magnetic field detector.

Once a gradiometer has been devised, the magnetometers can be optimized by application of a technique for determining distance and weighting of the magnetometers. The distance between the outermost magnetometer pair is selected based on the application in which the gradiometer is to be used. For example, compact baselines may be preferred for "close-in" medical magnetic field measurements, while large baselines may be preferred for large-scale field measurements, such as the location of large ferromagnetic objects or deposits on the ocean floor. The technique of optimization does not require a specific baseline for successful application.

The development of a unidirectional gradiometer entails positioning at least one magnetometer between the outermost magnetometers on a selected baseline. One common configuration in the art is called a second order gradiometer, discussed below in reference to FIGS. 7C and 7D. The second order gradiometer rejects only the signals along the perpendicular from the baseline between the two magnetometers.

A digital signal processor or other digital computing device may be employed to operate a preferred embodiment of the gradiometer. Analog processors are also possible once the magnetometers' positions and weights have been set; however, an analog processor has a drawback in that it is not easily adjustable once fabricated. The proposed digital gradiometer has the advantage that the pattern of sensitivity can be adjusted as required after the fabrication through digitally updating the weights associated with the respective magnetometers that are stored in the digital processor or memory associated therewith.

In broad terms, a preferred embodiment of the gradiometer includes at least three magnetic sensors in linear alignment on a common axis. A sensing axis and polarity of each magnetometer is aligned with that of the other magnetometers along the common axis. The positions of the outermost magnetometers are selected based on criteria for the application of use. The position of the magnetometer(s) between the outermost magnetometers is/are calculated utilizing an embodiment of a magnetometer positioning/weighting optimization method.

In broad terms, an embodiment of the magnetometer positioning/weighting method includes the following steps:

1. Once a baseline has been selected, the number of "inner" magnetometers is chosen depending upon the user's desire for directivity or other technical criteria.

2. The position of the magnetometers is established using any applicable numerical method.

3. The position and vector magnitude of the interfering and desired magnetic signals are modeled, optionally utilizing the same numerical method as in Step 2 immediately above.

4. An equation for received magnetic signal combinations is input to a numerical optimizer, such as least squares or successive approximation optimizer, as is common in the art.

5. Constraints of the method are entered into the optimization equation. The constraints include:

(a) The sum of the signal weightings must be zero.

(b) The received interference signal must be zero or reduced to a desired value.

(c) The received signal of interest must be maximized.

6. The optimizer then changes the signal weighting while moving the inner magnetometers until a satisfactory solution is found. The values of the weightings are not constrained to positive-only or negative-only values. The values can be continuous or discrete, positive or negative, so long as the conditions of Step 5 above are met.

7. Once the numerical optimizer has reached a level of being sufficiently close to the signal goals, the optimization process can be stopped, and the calculated values can be used for construction of the magnetic field gradiometer(s).

Figure 7A:
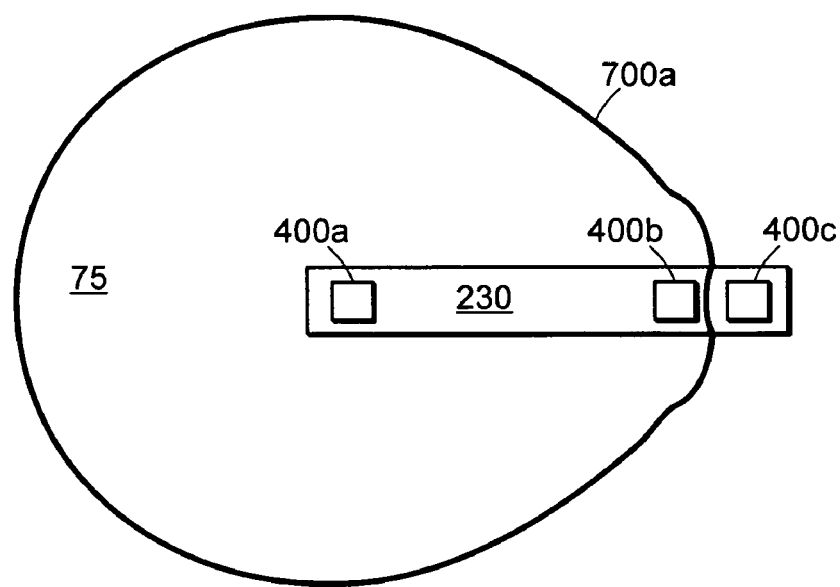
FIG. 7A is a magnetic pattern diagram for the gradiometer of FIG. 4A.

FIG. 7A is a diagram of a gradiometer 230 with magnetometers 400$a$, 400$b$, and 400$c$ positioned using the process just described. In one embodiment, the two outer magnetometers 400$a$ and 400$c$ are arbitrarily positioned, and at least one other gradiometer 400$b$ is positioned relative to the outer two magnetometers 400$a$ and 400$c$. Unequal weights are calculated for the magnetometers that the processor 410 uses to scale outputs of the magnetometers 400. The processor 410 combines the scaled outputs to orient a direction of gradiometer sensitivity, represented by a sensitivity lobe 700$a$, toward a volume of interest, which is to the left in the example of FIG. 7A.

In one embodiment, the positions of the magnetometers 400 are determined, optionally along a single axis, according to a number of parameters, such as available size of a structure into which the gradiometer 230 is to be deployed. To improve sensitivity of the gradiometer, the outer two magnetometers 400$a$ and 400$c$ are preferably positioned as far apart as possible within a given constraint. The middle magnetometer 400$b$ in a portal metal detector application is positioned closer to the outer magnetometer 400$c$ farther away from the volume of interest without touching that outer magnetometer 400$c$.

In this embodiment, after the positions of the magnetometers 400 are set, the weights are calculated preferably using deterministic mathematical techniques, such a through use of a least squares optimization technique. For flexibility of design, the weights can be non-integer weights. Use of non-integer weights allows the sensitivity lobe 700$a$ to be optimized for use in a given application. In the case of the gradiometer 230 employing a digital processor 410, the digital processor 410 can adjust the weights during operation, thereby changing the characteristics of the sensitivity lobe 700$a$. Adjusting the weights to change characteristics of a sensitivity lobe can be compared to changing phase delays in a phased array radar system to effect the steering of the sensitive lobe in a desired direction.

Figure 7B:
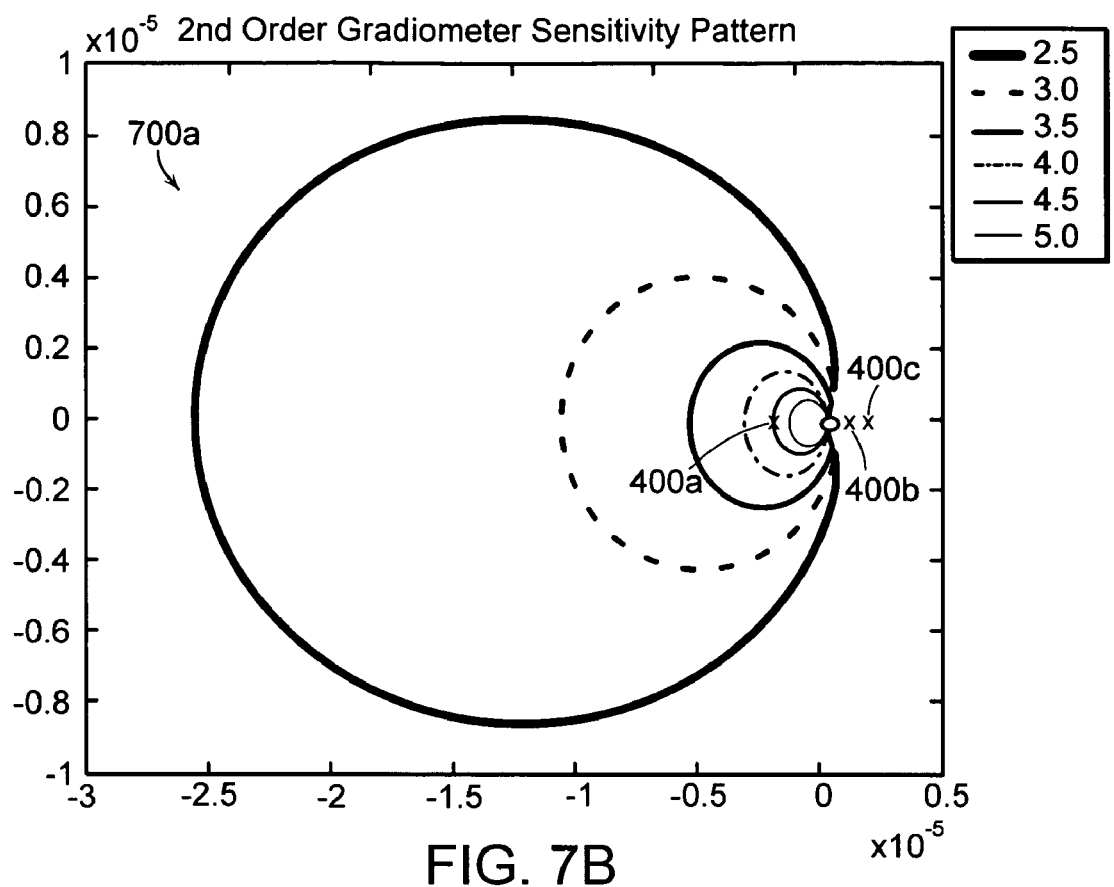
FIG. 7B is a detailed lobe diagram for the gradiometer of FIG. 7A.

FIG. 7B is a detailed plot of the sensitivity lobe 700$a$. The positions of the magnetometers 400$a$, 400$b$, and 400$c$ are represented by lower case 'x' in the plot. As expected, sensitivity is much higher closer to the magnetometers 400 than farther away from the magnetometers. Of particular note, the sensitivity lobe 700a does not extend to the right of the magnetometers 400 based on the spacing and weighting.

Figure 7C:
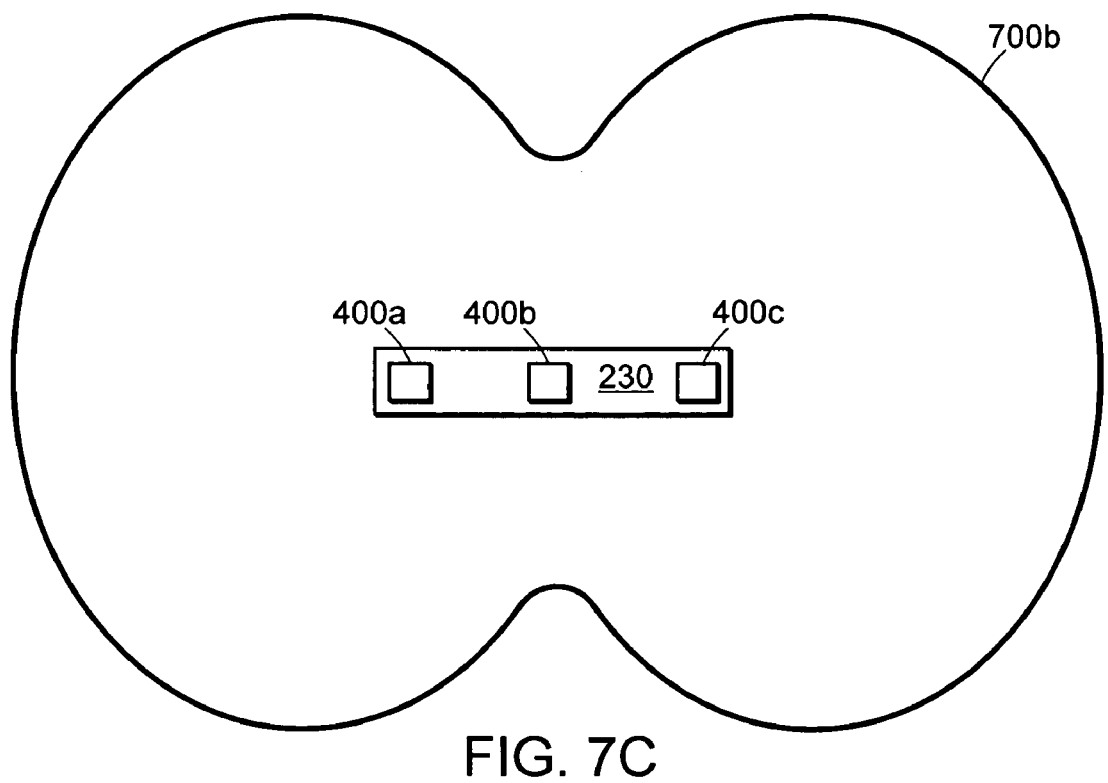
FIG. 7C is a lobe diagram for a prior art three-magnetometer gradiometer.

FIG. 7C is a diagram of the gradiometer 230 in which the magnetometers 400 are positioned equally distributed along a single axis and having equal weights assigned thereto for scaling their outputs. A corresponding sensitivity curve 700b, which is peanut-shaped, indicates that the sensitivity of the gradiometer 230 extends into a volume of interest (to the left) and also into a volume that may not be of interest (to the right). As a result, a magnetic disturbance that is outside the volume of interest, such as a wall, other portal metal detector, or other machine, can influence measurement results in a detrimental manner.

Figure 7D:
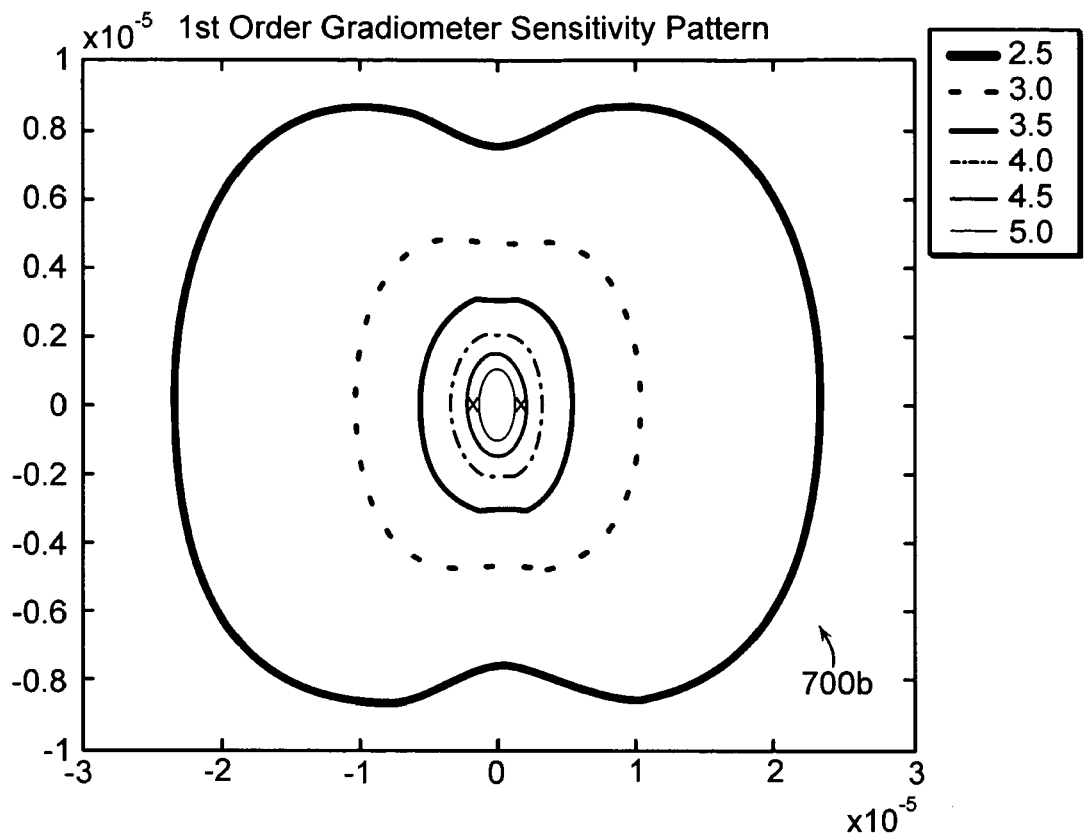
FIG. 7D is a detailed lobe diagram for the prior art, three-magnetometer gradiometer of FIG. 7C.

FIG. 7D is a detailed plot of the sensitivity lobe 700b corresponding to the equally-spaced, equally-weighted embodiment of FIG. 7C.

Figure 8:
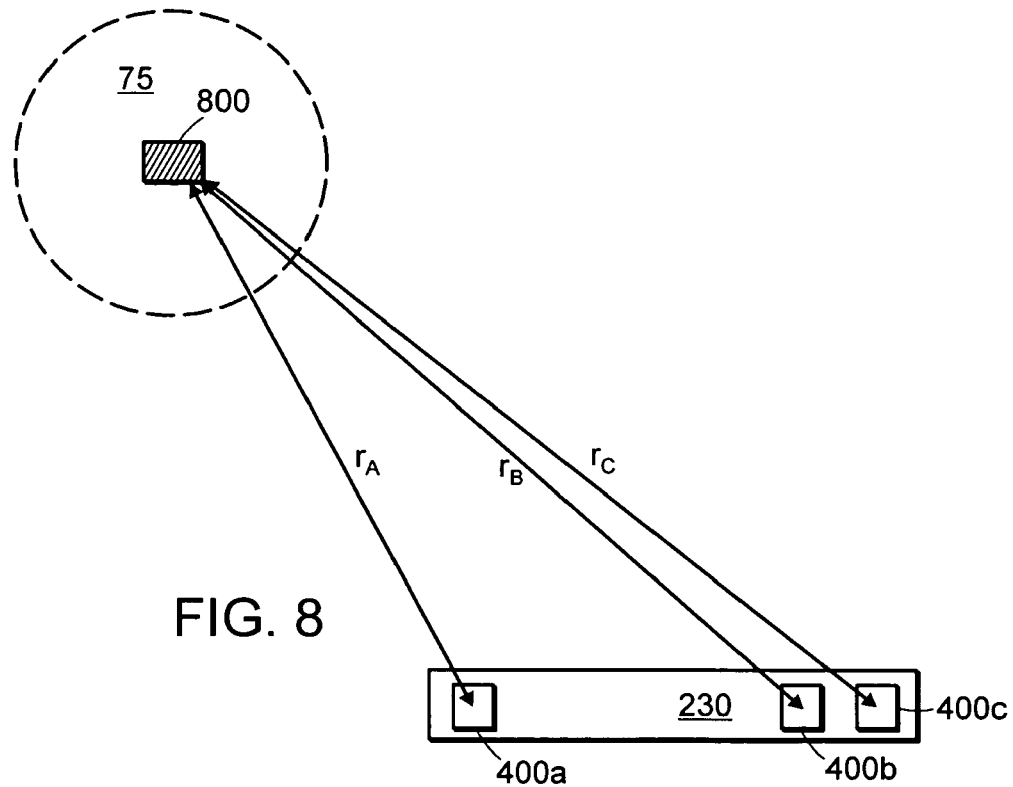
FIG. 8 is a vector diagram for the gradiometer of FIG. 7A measuring a target object.

FIG. 8 is a vector diagram which, along with the equations that follow, provides a more detailed analysis of the process used to make and use the gradiometer 230 of FIG. 7A.

The magnetic field produced by a single magnetic dipole is given by:

$$B(r_i) = \frac{\mu_0}{4\pi}\left(\frac{3[M \cdot (r_i)]}{r_i^4} - \frac{M}{r_i^3}\right) \quad \text{E1}$$

Where $r_i$ is the vector position of the dipole 800 relative to the sensitive elements 400a, 400b, 400c making up the preferred second order gradiometer. M is the vector dipolar magnetic moment of the target object. Complex objects that make up the targets of interest may be viewed as a collection of dipole objects with their magnetic fields superimposed upon each other without any loss of generality. The optimization method holds for complex objects as well as simple objects in this formulation.

The sensed magnetic field at each magnetometer is proportional to the area, A, of the magnetometer and the orientation of the sensitive axis, V, to the dipole moment's principal axis. The responsivity constant $\epsilon$ of the sensor material in units of changed characteristics (resistance, voltage, current) per unit area is also included to properly scale the expected output of the magnetometer. The response of the individual magnetometer is then:

$$Q_i = \epsilon \cdot A \cdot B(r_i) \cdot V_i \quad \text{E2}$$

The equation indicates the measured signal is proportional to the collection area multiplied by the sensitivity of the materials used and the vector product of the field strength and direction of the target object relative to the sensitive axis of the magnetometer.

The preferred gradiometer configuration 230 includes three magnetometers, each having a different response to the target object due to differing geometries and aspects relative to each other and the target object. The summary response of the k-th individual gradiometer is made up of the weighted sum of the individual responses of the n magnetometers:

$$T_k = \sum_{i=1}^{n} a_i \cdot Q_i \quad \text{E3}$$

$T_k$ is the output of the magnetic field gradient sensed by the gradiometer 230. The same equation is used as the basis for the optimization of the $a_i$ coefficients allowing the practitioner to adjust the response lobes of the gradiometer as described elsewhere in this document.

Turning now to operation of the gradiometers 230 and arrangement of gradiometers 230, the many processors associated with the gradiometers 230 cause them to operate in multiple modes.

At the multi-modal operational level, the present invention includes an implementation of a gradiometer having at least three vector magnetometers. In a preferred embodiment, the magnetometers are each independently controlled and measured. Each magnetometer may include independent biasing, control, and measurement circuits. Offset of the magnetometers is controlled without use of an additional magnetometer specifically designed to do so. Common mode coupling is eliminated by independence of the individual magnetometers in preferred embodiments. The effect of the independence allows adjustment and refinement of the overall gradiometer output without undesirable effects of convolving the errors of the magnetometers together.

The magnetometers within the gradiometer can be switched between an active measurement mode and a non-active mode, where the non-active mode is also referred to herein as a "background offset reduction mode." During the non-active mode, correction for a plurality of errors common to vector magnetometers can be accomplished by the gradiometer or processor(s) associated therewith.

One advantage of the multi-modal aspect of the present invention is that the gradiometer performance can be continuously maintained against drift and errors induced by changing environmental conditions. Another advantage of the multi-modal aspect of the present invention is that, because of the continuous adjustments against drift and errors, the gradiometers can produce data at high rates. Common gradiometers produce data at 10 to 20 Hz rates. The gradiometer of the present invention can produce rates up to 50,000 Hz with no loss of dynamic range or accuracy. The gradiometer 230 at its core comprises at least three vector magnetometers 400. Each magnetometer 400 may have a bias source driven by a controlled Digital-to-Analog (D/A) converter, an Analog-to-Digital (A/D) converter for the measured magnetic field, and digitally-controlled support circuitry for offset adjustment, typically by another, independent, digital-to-analog conversion. In use, a preferred embodiment of the multi-modal gradiometer is operated by a Digital Signal Processor (DSP) element that can process the data from the magnetometers, provide offset estimations, and perform other functions for successful operation of the circuit.

Table I provides a listing of the multiple modes and a definition corresponding to each:

TABLE I

| Mode | Definition |
|---|---|
| Measurement mode | Use of gradiometers 230 to measure a volume of interest for target objects. |
| Background offset reduction mode | Use of gradiometers 230 to measure a background offset and processing applied in either real-time or post-processing to remove the background offset from measurements. |
| Calibration mode | The processor 410 applies a magnetic field generated locally at the magnetometers 400 and measures a reaction by the magnetometers 400 to determine a calibration curve for compensating measurements made by magnetometers 400. |
| Self-test mode | The processor 410 puts components of the gradiometer in states to compare measured |

TABLE I-continued

| Mode | Definition |
|---|---|
| | performance of the components in those states against specified performance in those states to determine operational readiness. |
| Automatic alignment mode | The processor 410 captures and averages magnetic field strength over a long duration while compensating for background disturbances to calculate the alignment of the gradiometers 230 relative to the earth's magnetic field or other magnetic field providing a common influence on the gradiometers 230. Relative orientations of gradiometers 230 can be determined and used during measurements. |
| Diagnostic mode | The process 410 captures and outputs the measured field strengths by each magnetometer in an unaltered state (i.e., raw measurement data). |

FIG. 9 is a timeline 900 of an example of multiple modes of operation of an arrangement of gradiometers 230. The timeline 900 includes alternating modes of operation: background offset reduction mode 905 and calibration mode 910/measurement mode 915. The timeline 900 can be applied in at least two different ways for using the gradiometers 230 in a portal metal detector 100 application. The first way the timeline 900 can be applied is to alternate modes of operation while processing a line of people proceeding through the portal 105 of the magnetic screening systems 100 of FIG. 1, where background offset reduction mode 905 occurs at times no one is walking through the volume of interest and calibration mode 910 and measurement mode 915 occur at times someone is walking through the volume of interest. The timeline 900 can also apply to a time when someone is walking through the volume of interest, where the modes 905, 910, and 915 alternate a selectable number of times. The more times the background offset is reduced and calibration is performed, the better the accuracy of the measurements.

FIG. 10 is a timing diagram 1000 showing relative timing of portions of the timeline 900 and the bridge bias voltage 440'. In this embodiment, during opposite periods of a 1 msec frame time 1020 or other rate suitable for the application in which the gradiometers 230 are employed, a process executing the measurement mode of operation switches between calibration mode 910 and measurement mode 915. Alternatively, the process may include background offset reduction mode 905, which includes set/reset settle 1010a and active background control 1010b followed by measurement mode 915. In another embodiment, calibration mode 910 and background offset reduction mode 905 are executed in a selectable manner on opposite phases of the bridge bias voltage 440' from measurement mode 915. For example, a timing sequence may be as follows: background offset reduction mode 905, measurement mode 915, calibration mode 910, measurement mode 915, and repeat. In another example, background offset reduction mode 905 may not occur during the same phases. In yet another example, background offset reduction mode 905 occurs every nth time a measurement mode 915 occurs. In still yet another embodiment, calibration mode 910 occurs every nth time a measurement mode 915 occurs. It should be understood that any number of combinations of mode sequences can be employed, which may be dictated by a false alarm rate or other metric associated with the measurements.

Continuing to refer to FIG. 10, calibration mode 910 includes measuring positive samples 1005a and negative measurements 1005b corresponding to the bridge bias voltage 410'. Similarly, measurement mode 915 includes measuring positive samples 1015a and negative samples 1015b corresponding to the bridge bias voltage 410'. Multiple samples may be measured and averaged or otherwise computed to determine a noise resistant measurement. In addition, the background offset reduction mode 905 includes a set/reset settle time 1010a, during which the magnetometers 400 are driven to reset, and an active background control time 1010b, during which a background magnetic field is measured and its effect on the magnetometers 400 is reduced.

Figure 11A:
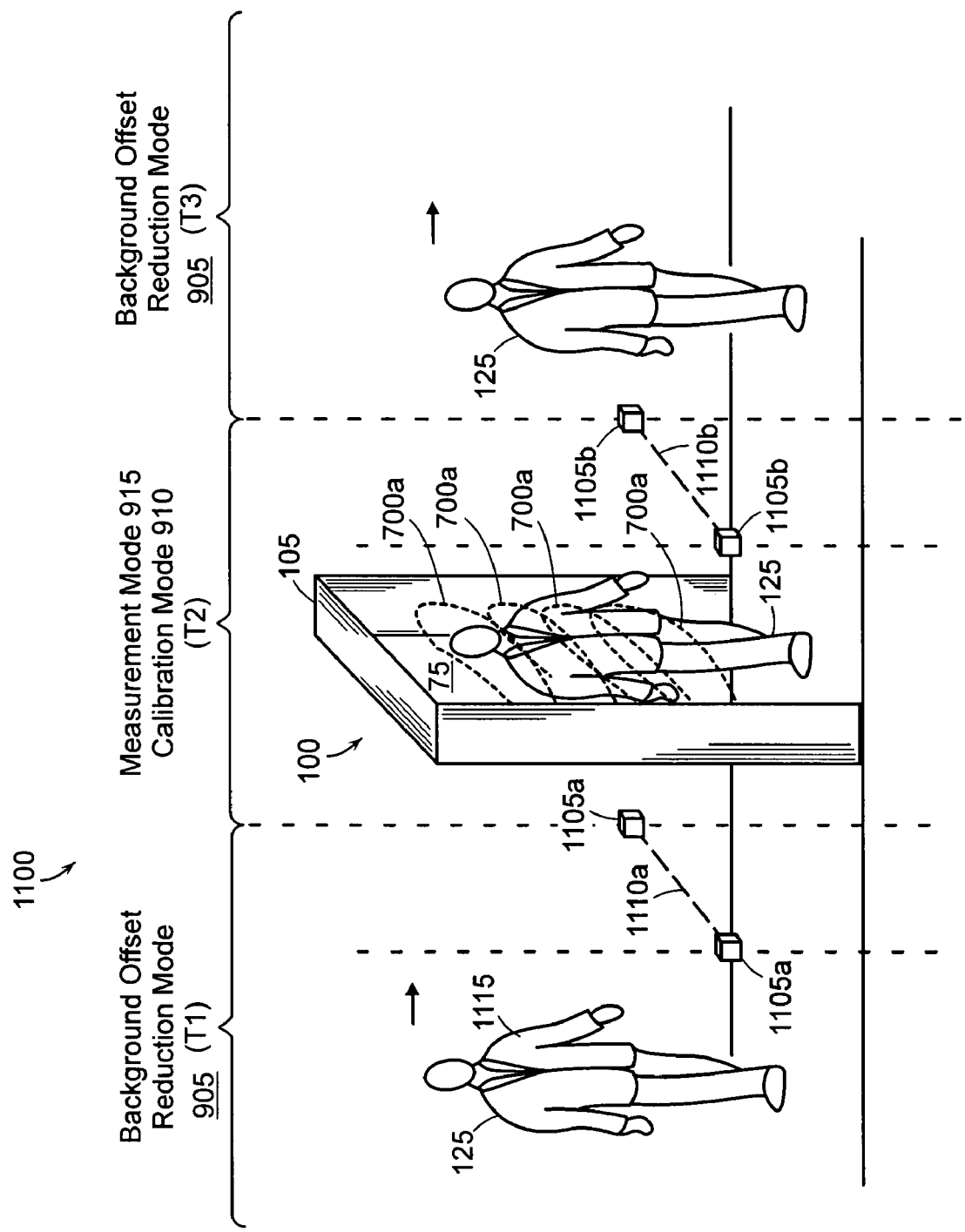
FIG. 11A is a graphical diagram illustrating a real-world example for the magnetic screening system of FIG. 9.

FIG. 11A is a graphical diagram of an example application in which an arrangement of gradiometers 230 is deployed to detect target objects carried by a person. In this example, the person 125 at time T1, walking from left to right, approaches the portal 105 of the magnetic screening system 100. During this time (T1), the magnetic screening system 100 operates in the background offset reduction mode 905. As the person 125 approaches the portal 105, the person 125 passes a first pair of optical sensors 1105a that senses the person 125 disrupting an associated optical beam 1110a. In response, the magnetic screening system 100 in communication with the first pair of optical sensors 1105a exits background offset reduction mode and enters measurement and calibration modes 910, 915, during time (T2).

During time T2, the person 125 passes through the volume of interest 75 whose boundaries are defined on both sides, in this embodiment, by the gradiometers 230 deployed in the vertical columns on either side of the portal 105. The sensitivity lobes 700A, described above in reference to FIGS. 7A and 7B, extend through the volume of interest 75 and enable the gradiometers 230 to detect any ferromagnetic objects being carried by the person 125. The person 125 continues to a second pair of optical sensors 1105b having its own optical beam 1110b, which is interrupted as the person 125 passes. Upon notification that the person 125 has exited the volume of interest 75, the magnetic screening system 100 again returns to background offset reduction mode 905 in time T3.

It should be understood that the optical sensors 1105 are an example of sensors that can be used to detect when the person 125 is approaching or leaving the volume of interest 75. Motion detectors, active floor mats, or the magnetic screening system 100 itself may also be used to detect positions of the person relative to the volume of interest 75. In other embodiments, the system 100 may be operated without sensors for detection of entry of a person in the volume of interest 75. For example, an operator 130 (FIG. 1) may trigger measurement mode to begin. As another example, measurement mode may occur continuously with calibration mode and background offset reduction mode being used on a periodic basis, on an "as needed" basis such as through automatic triggering based on a metric associated with a gradiometer 230 or magnetometer 400, or on any other basis.

Of particular interest in the example application 1100 of FIG. 11A is that the person 125 does not need to remove his jacket 1115 to allow the magnetic screening system 100 to detect, identify, or classify any metal objects being carried therein. In addition, the person 125 does not need to remove from his clothing any potential target objects, such as a cell phone, loose change, keys, or other ferromagnetic items, that can be sensed by the magnetic screening system 100 incorporating the principles of the present invention on some or all of the different levels described herein.

Figure 11B:
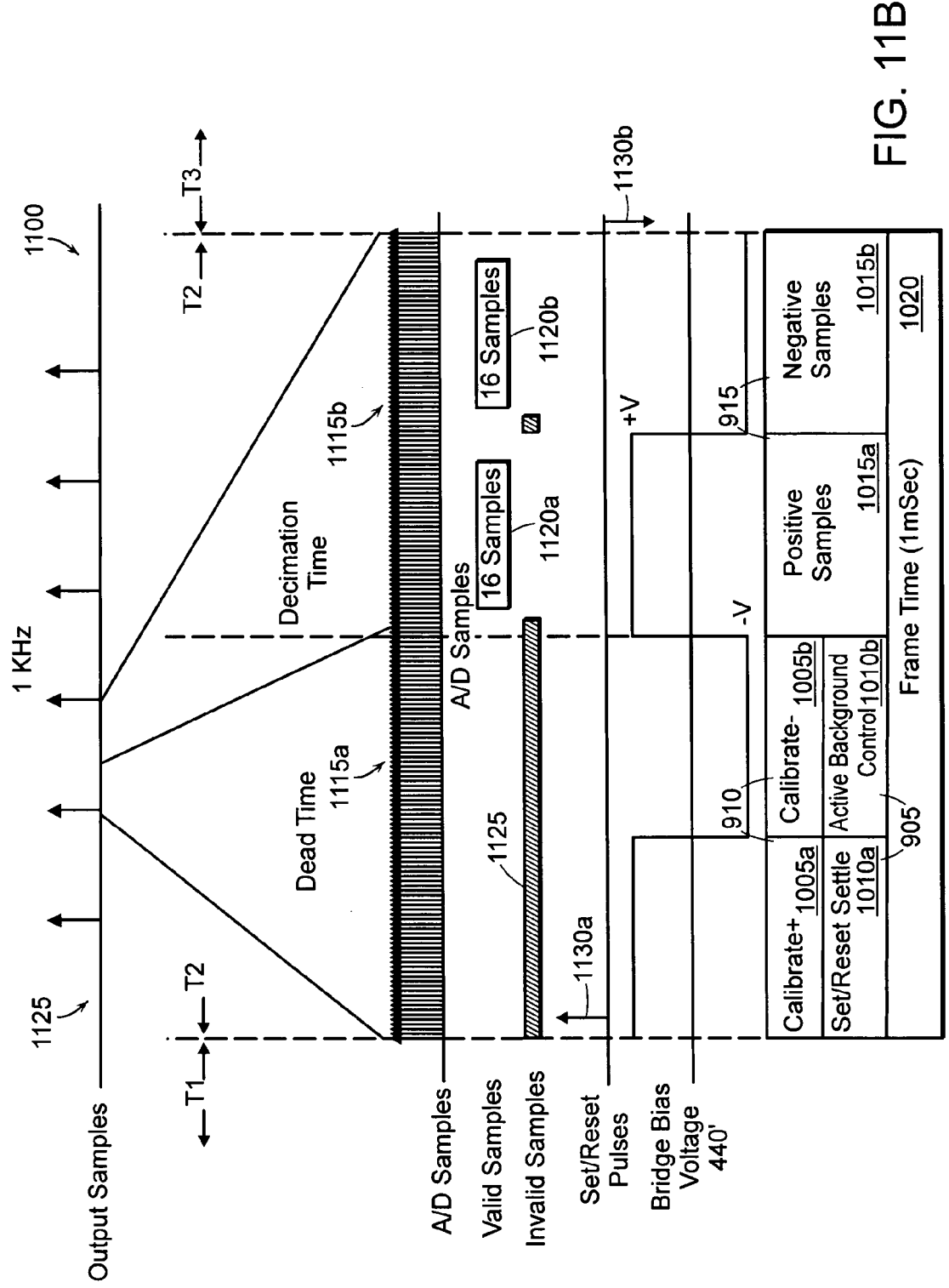
FIG. 11B is a detailed timing diagram corresponding to the real-world illustration of FIG. 11A.

FIG. 11B is a representation of the timing sequence 1100 illustrated in FIG. 11A. T1, T2 and T3 are shown in relation to multiple timing diagrams corresponding to the time T2 in which the person 125 is passing through the volume of interest 75. As indicated, once the person 125 interrupts the first optical beam 1110a, the magnetic screening system 100 begins to take samples and produce output samples 1105. As described above in reference to FIG. 10, the bridge bias voltage 440' occurs with (i) calibration mode 910 and optionally background offset reduction mode 905 occurring during a first period and (ii) measurement mode 915 occurring during a second period.

At the start of the measurement process, a set/reset pulse 1130a triggers positive to indicate that the measurement mode 915 has begun. During the measurement mode 915 period of the bridge bias voltage 440', the ADCs 430 (FIG. 4B) samples at a high rate, such as 10 kHz or higher, in this embodiment, to produce sixteen samples 1120a during the positive portion of the bridge bias voltage 440' and sixteen samples 1120b during the negative portion of the bridge bias voltage 440'. The samples are processed by the processor 410 and other processors, such as the screening computer 15 (FIG. 2). ADC samples 1115a during the first period of the bridge bias voltage 440' are considered invalid since they are taken during a "dead time," which is the period as described above during which the calibration mode 910 or background offset reduction mode 905 may be occurring and, therefore, the measurements do not relate to any target objects. The ADC samples 1115b during the measurement mode 915 may be decreased through decimation, for example, an output as output samples 1125 from the ADC 430 (FIG. 4B) for processing by the processor 410.

The timing diagram 1100 during the measurement period in time T2 continues and repeats so long as the person 125 in FIG. 11A is between the first and second pairs of optical detectors 1105a, 1105b, i.e., in the volume of interest 75. If a continuous line of people are passing through the volume of interest 75, the measurement mode may continue without interruption, and, in such a case, it is preferable that the background offset reduction mode 905 occur on a regular basis to ensure full dynamic range of the magnetometers 400 is maintained so that the gradiometer is maintained in a linear operating region.

It should be understood that the example timing diagram of FIG. 11B may be different in alternative embodiments of the arrangement of gradiometers 230. It should also be understood that the time frame 1020 of 1 msec may be faster or slower in such other embodiments. For example, the gradiometer processors 410 may cause the gradiometers 230 to sample at a rate greater than 50 Hz. The gradiometer processors 410 may also cause the gradiometers to switch between the measurement mode and the calibration mode at a rate greater than 0.1 Hz. In such an embodiment, the portal metal detector system 100 calibrates very slowly, as might be the case during a slowly passing person 125. In other embodiments, it is preferable to enter calibration mode 910 at least a few times while the person 125 is in the volume of interest 75. Thus, although calibrating at a 1 kHz rate may be excessive in some applications, it provides for a more accurate measurement. However, it should be understood that overall system error budgets can be achieved with slower rates, so the rates can be determined depending on the application or on a case-by-case basis.

Figure 12A:
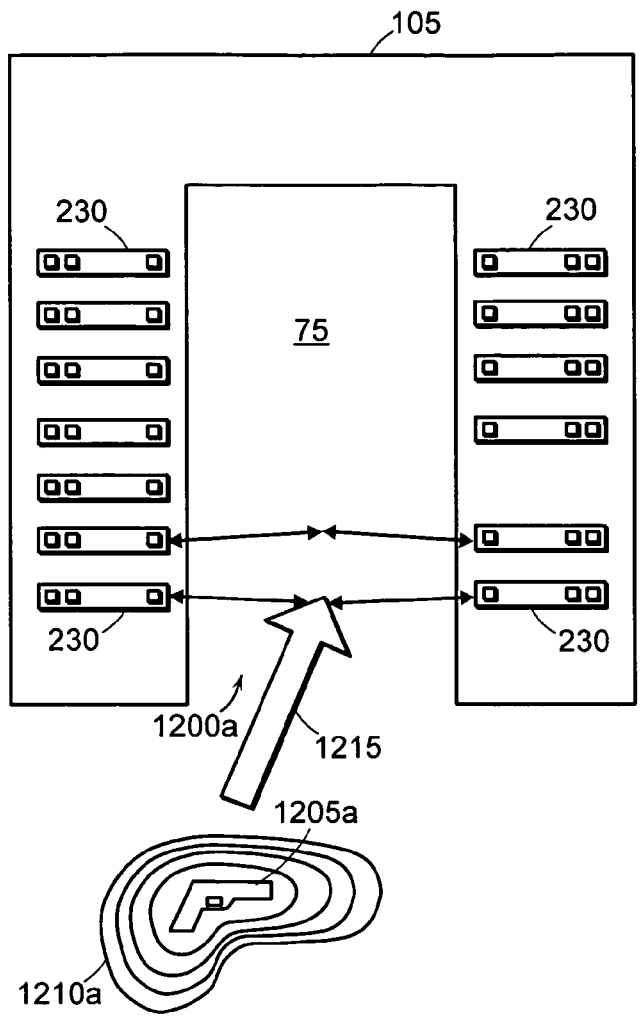
FIG. 12A is graphical illustration of target object having magnetic fields detectable by the magnetic screening system of FIG. 11A.
Figure 12B:
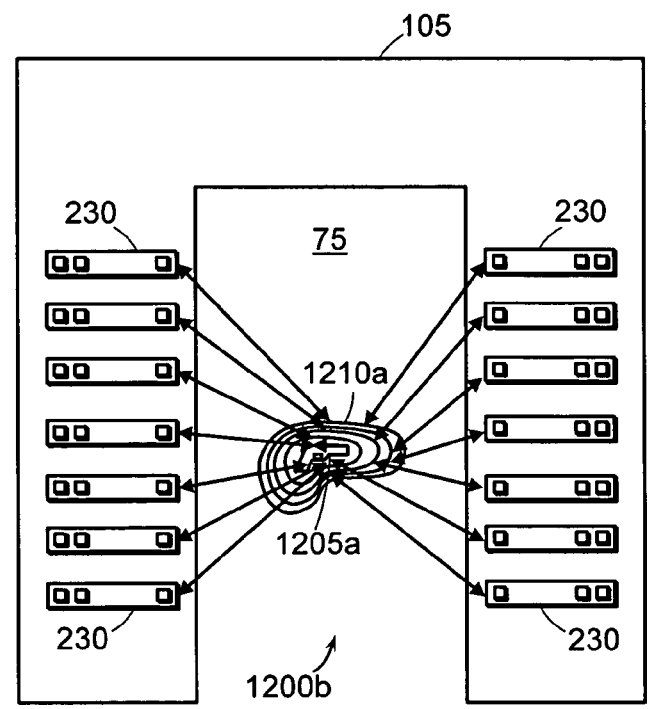
FIG. 12B is an alternative embodiment of the magnetic screening system of FIG. 12A using gradiometers in a tracking mode to track target objects in three dimensions.
Figure 12C:
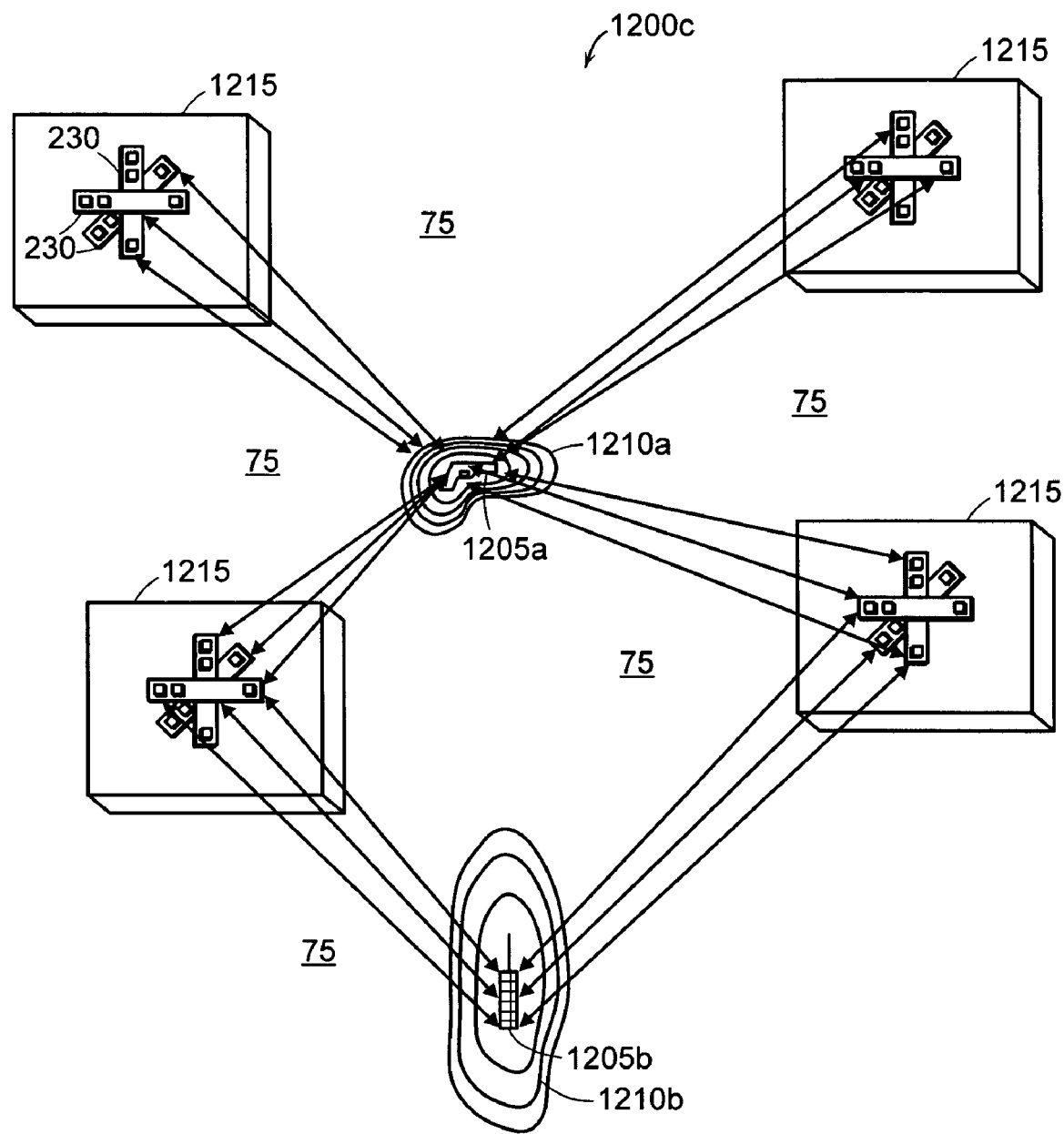
FIG. 12C is an alternative embodiment of the magnetic screening system of FIG. 12A in which an arrangement of gradiometers is deployed in non-portal fixtures and can operate in a tracking mode to track target objects in three dimensions.

FIGS. 12A-12C are system-level diagrams in which the assembly of gradiometers 230 can be used to detect target objects, such as a gun 1250a. In each of these embodiments, the measurement mode, background offset reduction mode, calibration mode, self-test mode, automatic alignment mode, diagnostic mode, or tracking mode may be employed.

Beginning with FIG. 12A, the target object 1205a, which produces a particular magnetic field disturbance 1210a due to the target object's influence on the earth's magnetic field or other magnetic field, traverses on a path 1215 on a person 125 into a volume of interest 75 in the portal 105. The gradiometers 230 in the portal 105 are operating in a measurement mode, and, as described above, their sensitivity lobes 700a are directed horizontally into the volume of interest 75 through proper design, as described above.

FIG. 12B illustrates the portal 105 with gradiometers 230 operating in the tracking mode. In the tracking mode, pluralities of the gradiometers 230 generate real-time tracks of target objects in three dimensions. Thus, instead of only providing horizontal look angle data by pairs of gradiometers 230, as illustrated in FIG. 12A, the gradiometers 230 of FIG. 12B sense and report three-dimensional positional information of the target object 1250a. The portal CPU 240 and screening computer 115 (FIG. 2) can provide the processing power for operating the gradiometers 230 in the tracking mode.

FIG. 12C is a top view of an alternative embodiment of a magnetic screening system 100 in which an arrangement of gradiometers 230 is employed to provide three-dimensional tracking information. In this embodiment, at least three gradiometers 230 are distributed about a volume of interest 75 for detecting, identifying, classifying, tracking, or combination thereof, target objects, such as a gun 1205a or cell phone 1205b. The cell phone 1205b has an induced magnetic field disturbance 1210b that is different from the magnetic field disturbance 1210a produced by the gun 1205a in the earth's magnetic field or other magnetic field. In either case, the arrangements of gradiometers 230 may be distributed in non-portal like fixtures, such as wastebaskets, planters, vending machines, or other discreet security fixtures, so as not to be intrusive or noticeable by patrons of a venue, such as an amusement park, sports arena, airport, government building, or other place in which detection of ferromagnetic objects is of interest.

In addition to providing a tracking mode, the processors associated with the arrangements of gradiometers 230 can initiate an auto-alignment process for each gradiometer. The arrangement processor 240 (FIG. 2) in communication with its respective arrangement of gradiometers 230 causes the gradiometers 230 to capture and average magnetic field strength over a long duration while compensating for background disturbances to calculate the alignment of the gradiometers 230 relative to the earth's magnetic field. In this way, the processors, such as the arrangement processor 240, screening computer 115, or other processor used for auto-alignment, can determine relative orientations of each gradiometer 230 to at least one other gradiometer in the system. Thus, in the scenario 1200a of FIG. 12A, it can be seen that the gradiometers 230 directly across from one another in the portal 105 are aligned with respect to one another. In the portal 105 used in the scenario 1200b of FIG. 12B, it can be seen that all gradiometers 230 are known relative to all other gradiometers 230 in the portal 105. In the scenario 1200c depicted in FIG. 12C, multiple arrangements of gradiometers 230 know orientations of other arrangements of gradiometers 230. In this way, tracking target objects 1205a, 1205b can be done with little set-up time and added expense.

In some embodiments, a diagnostic mode is possible in which the processor 410 (FIG. 4A) associated with the magnetometers 400 can capture and output the measured field strengths by each magnetometer 400 in an unaltered state. A higher-order processor such as the portal processor 240, screening computer 115, operator workstation 110, management station 215, or other processor tasked to run diagnostic tests can determine whether a failure, error, or other impairment to normal operations of any gradiometer 230 in the magnetic screening system 100 or magnetic screening system network 200 (FIG. 2) is a potential to adversely affect measurement.

Figure 13:
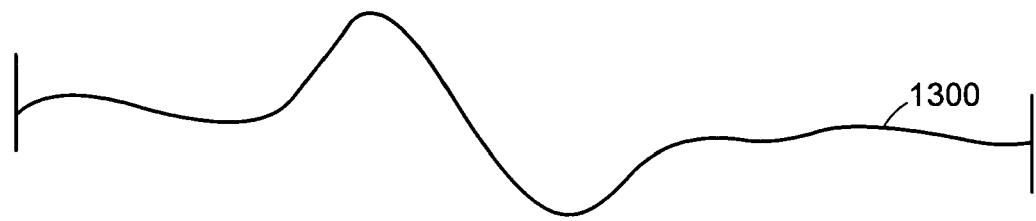
FIG. 13 is an example signature for a target object (e.g., a gun) captured by the gradiometer of FIG. 4A.

FIG. 13 is a time plot of a signature representing a measurement of a target object, such as a gun 1205a, passing through a volume of interest 75 as measured by gradiometers 230 in a portal 105 or other arrangement of gradiometers 230. The signature 1300 is therefore a representation of a time measurement of a target object's magnetic field induced by the earth's magnetic field as measured by the gradiometers 230 as a person 125 carries the target object through a volume of interest 75 in which the gradiometers 230 have oriented their directions of sensitivities. As well understood in the art, the signature 1300 is different for every target object. Therefore, the signature 1300 for a gun 1205 is different for the signature for a cell phone 1205b, so processors 410, 240, or other processors adapted to identify or classify the target objects can do so if (i) the resolution of measurement is high enough (i.e., the number of samples taken as a target object passes through a volume of interest is at a high enough rate) and (ii) the processing is adapted to discern differences between or among target objects or classifications of target objects.

To determine signatures for target objects, there are several ways to train a magnetic screening system 100. One way to train the system 100 is to perform a measurement of a target object in multiple orientations as it progresses through a volume of interest 75 being measured by an arrangement of gradiometers 230. Such a case can be done in a controlled manner with a robot moving a target object through the volume of interest 75 in different orientations. The signature 1300 is captured and stored in a database along with an identifier and optional graphical representation of the target object for use in field deployed magnetic screening systems 100.

Another way to train the magnetic screening systems 100 is for a target object unknown to the system to cause an alert to an operator of the magnetic screening system 100 that the target object is unidentified (i.e., its signature is not found in a local signature database maintained by the magnetic screening system 100, cluster 50 of magnetic screening systems 100, or network wide level. In such case, the operator of the magnetic screening system 100 can visually inspect the target object, which may be, for example, a newly-released cell phone or other ferromagnetic object newly introduced in the consumer market, for example. The operator of the system can then add the signature of the target object to a database at the arrangement of gradiometers level, cluster of arrangements of gradiometer level, or network wide level, and associate a description, identifier, or graphical representation with the signature in the database. In this way, the next time the same signature is identified by a magnetic screening system 100 having the signature in its database, the system 100 can inform the operator of what the target object is. If the same target object is carried through a volume of interest 75 and again not recognized by the magnetic screening system 100, it may be because the target object was carried through the volume of interest in a different orientation from the previous time in which the identity of the target object was determined and entered into the signature database(s). In this case, the operator of the magnetic screening system 100 can choose to enter the new signature to the database and associate it with the identifier, classification, or graphical representation previously entered in the signature database. In this way, the magnetic screening systems 100 can adaptively learn of new target objects without having to be learned in a controlled environment by a manufacturer, distributor, or other company associated with producing, distributing, or selling magnetic screening systems 100. In some embodiments, signatures measured or previously associated with known target objects are displayed on the operator station 110 to allow the operator 130 to make an informed choice as to whether to add the newly acquired signature 1300 to the database(s).

In the magnetic screening system network 200 of FIG. 2, the screening computers 115 may transmit respective local databases of signatures to the management station 215 for storage of the newly identified signatures 1300 corresponding to the target objects periodically or on an event driven basis. For example, periodically may mean the local database of target object signatures is uploaded to the signature database server 220 on an hourly basis, daily basis, weekly basis, or monthly basis. An event driven basis may be done as a result of detection of a target object, either known or unknown, an operator request, or upon initiation of a self-test.

The management station 215 may also transmit the central database of signatures stored on the signature database server 220 to the local databases stored at the magnetic screening systems 100, for example, periodically or on an event driven basis. The event driven basis in this case may be on receipt on an unknown target object from one of the screening computers 115, an operator request, receipt of a new signature, a system reboot, or a system power-up. It should be understood that other events, foreseen or unforeseen, may also be used as a trigger to either upload or download signatures of target objects, either previously known or unknown, for use by the magnetic screening systems 100 to continually improve on their ability to detect, identify, classify, or otherwise recognize a target object so as to continue to reduce a rate of false alarms, which ultimately result sin higher speed processing of people passing through the volume(s) of interest 75.

Figure 14A:
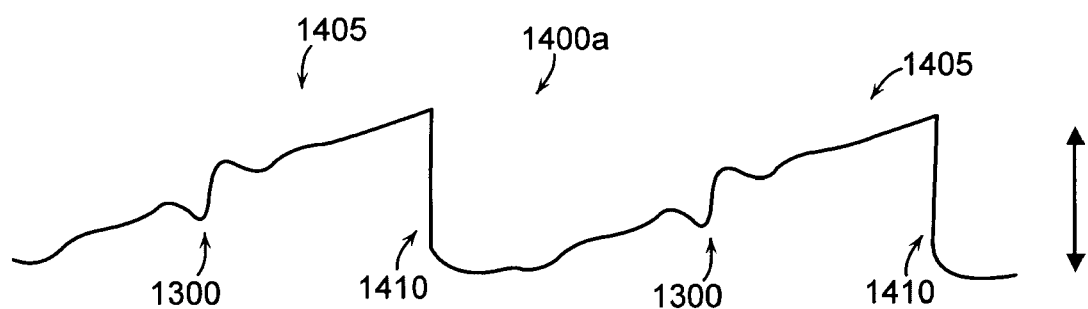
FIG. 14A is a signal diagram illustrating the signature of FIG. 13 in a measurement signal affected by a background disturbance and captured by the gradiometer of FIG. 4A.

FIG. 14A is a time plot 1400a of a measurement of the target signature 1300 as it passes through the volume of interest 75. In this example, a source of background offset affects measurements by the gradiometers 230. The effect manifests itself in the form of a slope of the curve over which the target object's signature 1300 is superimposed. At repeating intervals, the magnetometers 400 in the gradiometer 230 are reset, as described above, so as to ensure full dynamic range for the next measurement. A source of background offset is a wheelchair, for example, that is nearby the arrangement of gradiometers 230. The period for reset may be when the person 125 crosses through the optical beam 110a (FIG. 11A) or may be on a sample-by-sample basis at a 1 kHz interval (FIG. 11B) or other measurement rate.

Figure 14B:
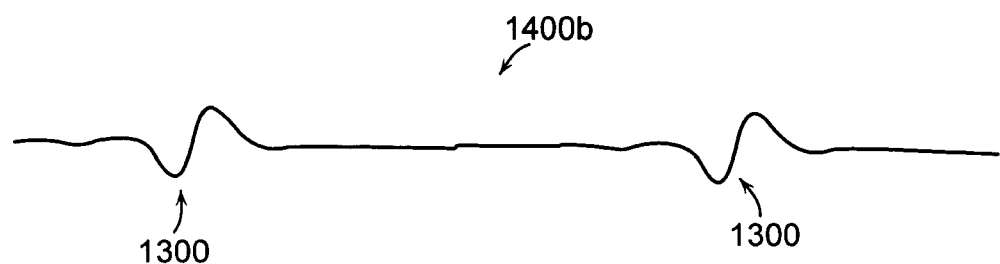
FIG. 14B is the signal diagram of FIG. 14A with a background offset removed either in real-time or during post processing.

FIG. 14B is a plot 1400b of the measurement curve 1400a of FIG. 14A with the slope of the curve removed through use of a background offset reduction process, either in real-time in a sample-by-sample basis or through use of post-processing. In the case of post-processing, instead of resetting the magnetometers 400 before each sample measurement is made, a measurement of the background offset is captured and associated with each sample point and provided to the arrangement processor 240 for use in mathematical removal of the background offset. The result is a curve 1400b with offset removed so that the target signature 1300 is more easily discernable. In addition, the target signature 1300 can be normalized, optionally in amplitude, time, phase, or combination thereof, for more easily being matched to a signature in a local signature database or central signature database. It should be understood that various processing improvements may also be applied. For example, after normalization, a data reduction process, encryption process, time-frequency analysis, or other processing may be employed so as to make further processing, data sharing, or other use of the data be done in a more efficient manner.

FIG. 15 is a block diagram of an example process performed on the target signature 1300. During field measurements 1505, the target signatures 1300 are captured by the magnetometers 400 of the gradiometers 230. The gradiometer processors 410 perform a number of processes 1510 on the target signatures 1300. The processes 1510 may include a wavelet transform 1520, matched filter 1525, fuzzy logic 1530, and joint time-frequency analysis 1535. The target signature 1300 is provided to each of these processes for use in analysis.

The wavelength transform 1520 produces a frequency versus time table or other data representation with magnitudes determined as a function of frequency and time. The matched filter 1525 compares the target signature to filters with impulse response possibly matching the target signature, which, when matched, results in a dipole and indication of where the target object is located on the person 125 passing through the volume of interest. The fuzzy logic 1530 includes empirical rules (e.g., item in sock) that, when matched, generates an indication, output by the fuzzy logic 1530, to have the person 125 be stopped for a search, since, for example, a person carrying a ferromagnetic object tucked in a sock is likely to be concealing a weapon.

Another form of processing is the joint time-frequency analysis 1535, which can be used to generate a contour map of the target object so that further processing or a magnetic screening system operator can visually see the target object on a display (FIG. 1).

Each of the processes described may be performed by the gradiometer processor 410 at the gradiometer level. Each of the processes 410 can also output data or information for use by the screening computers 115 to further process the target object signatures 1300. Examples of processing executed by the screening computers 115 is a neural network or polynomial decision tree 1540 that can classify the target object into one of multiple classes, such as a dangerous object, non-dangerous object, or unknown object. This can be done by determining a percentage of match of a large amount of uncharacterized data to known signatures stored in a local database. The result from the processing 1515 by the screening computer 115 is an indicator 1545, such as text (e.g., "gun"), icon, color light indicator 120 (FIG. 1) or other means for alerting another machine or security personnel. In the case of a physical machine, such as a turnstile or other mechanism that controls a passageway may be placed into a "locked" position so the person 125 carrying the dangerous object or unknown object can be searched. Otherwise, the turnstile or other mechanism can remain in an unlocked state to allow the person to pass. Any other type of machine, such as computer, alarm system, paging system, and so forth may also receive an alert signal.

Figure 16:
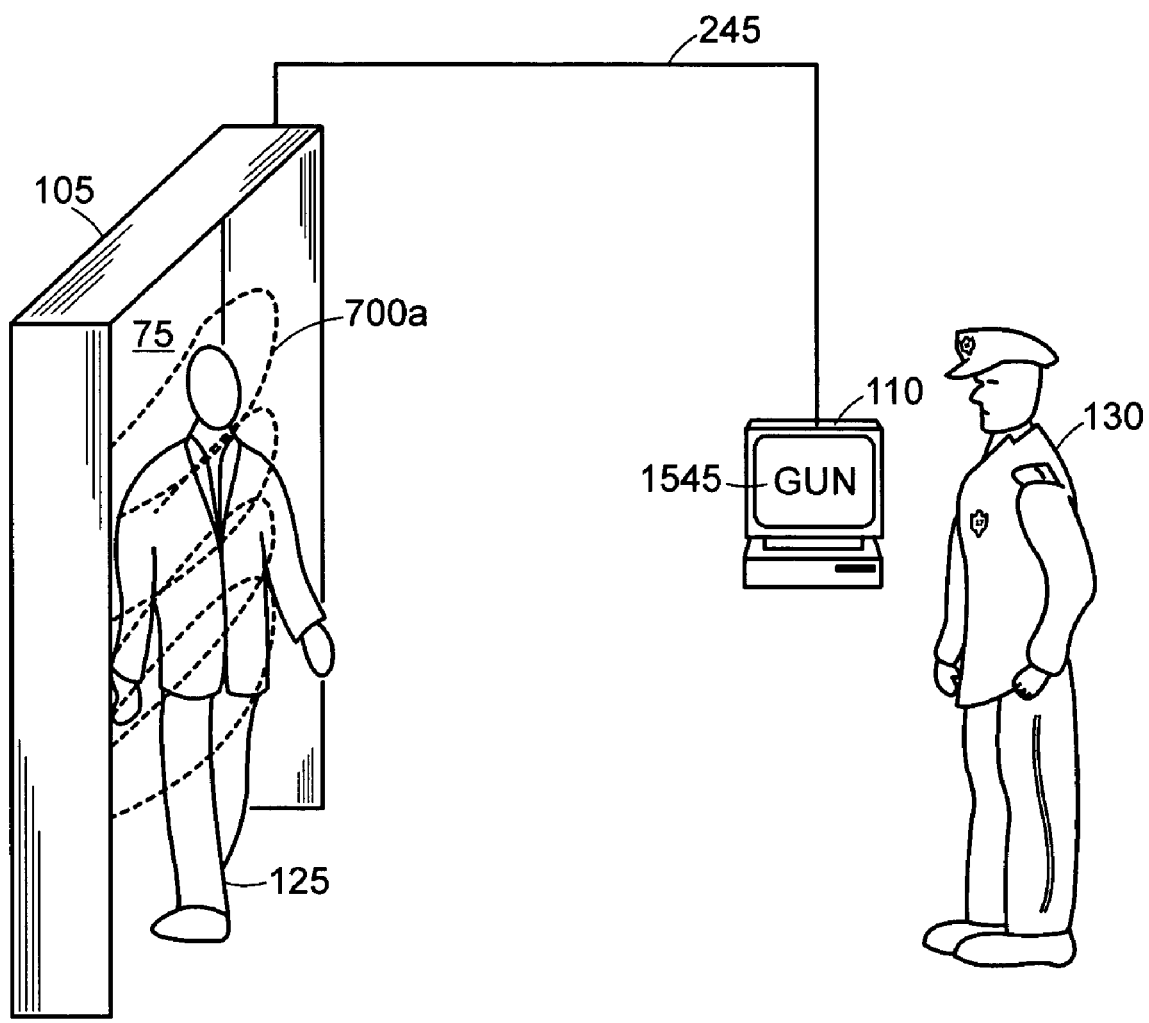
FIG. 16 is a graphical diagram illustrating the magnetic screening system of FIG. 1 that is presenting an indicator produced by the processing of FIG. 15 to a portal metal detector operator.

FIG. 16 is a graphical diagram of the person 125 passing through the portal 105 of the magnetic screening system 100 (FIG. 1). The magnetic screening system operator 130 is standing by and observes an identifier 1545 (e.g., "gun") displayed on the system display 110. In response, the magnetic screening system operator 130 is able to stop the person 125 for inspection or "pat down" to locate all ferromagnetic objects being carried. If the ferromagnetic object turns out to not be a gun, the operator 130 may enter such information into a local signature database for future reference. This information, as described above, may be uploaded or sent to a central database for use in updating its records and disseminating the new signature data or information to all of the magnetic screening systems 100 to reduce false alarms.

While this invention has been particularly shown and described with references to preferred embodiments thereof, it will be understood by those skilled in the art that various changes in form and details may be made therein without departing from the scope of the invention encompassed by the appended claims.

While this preferred embodiment of the system is totally electromagnetically passive, other embodiments may employ active field generation to stimulate the target objects into electro-magnetic oscillations that may be detected. The active driving functions may simply be wire loops stimulated with radio frequency pulses or antennae designed to produce localized fields. In any actively driven embodiment, the operating principles of the apparatus and optimization methods remain the same.

The arrangement of the magnetometers shown in the invention has been linear in nature. There are no implied limitations of the location of the magnetometers for the screening application. The magnetometers, so long as their location is known and they are proximal to the area to be monitored, can be in any configuration. The optimization method and operating modes incorporated in the invention can be equally applied as effectively to a different, non-linear distribution of the constituent magnetometers.

What is claimed is:

1. A magnetic screening system, comprising:
   an arrangement of gradiometers each including at least three magnetometers;
   a gradiometer processor in communication with the magnetometers that scales outputs from the magnetometers with unequal weights and combines the scaled outputs to orient a direction of sensitivity of the respective gradiometer toward a volume of interest; and
   at least one arrangement processor in communication with the arrangement of gradiometers that uses the gradiometers in a collective manner to detect a target object.

2. The magnetic screening systems according to claim 1 wherein the arrangement of gradiometers define a portal.

3. The system according to claim 1 wherein the at least one arrangement processor localizes a position of the target object.

4. The system according to claim 1 wherein the at least one arrangement processor identifies the target object.

5. The method according to claim 1 wherein the at least one arrangement processor classifies the target object.

6. The system according to claim 1 wherein the arrangement of gradiometers define at least one boundary of the volume of interest.

7. The system according to claim 1 wherein each gradiometer senses a local disturbance in a magnetic field in an electromagnetically passive manner.

8. The system according to claim 1 further including a target object signature database, and wherein the at least one arrangement processor is in communication with the signature database and compares measurements by the arrangement of gradiometers against signatures of target objects stored in the signature database.

9. A method for operating a magnetic screening system, comprising:

applying unequal weights to outputs of at least three magnetometers in a gradiometer in an arrangement of gradiometers;

combining the unequally weighted outputs to orient a direction of sensitivity toward a volume of interest; and using the gradiometers in a collective manner to detect a target object.

10. The method according to claim 9 wherein the arrangement of gradiometers define a portal.

11. The method according to claim 9 further including localizing a position of the target object based on measurements by the gradiometers.

12. The method according to claim 9 further including identifying the target object based on measurements by the gradiometers.

13. The method according to claim 9 further including classifying the target objects based on measurements by the gradiometers.

14. The method according to claim 9 wherein orienting a direction of sensitivity toward a volume of interest includes orienting a direction of sensitivity toward a pathway defined by a boundary including at least a subset of gradiometers of the arrangement of gradiometers.

15. The method according to claim 9 further including sensing a local disturbance in a magnetic field in an electromagnetically passive manner.

16. The method according to claim 9 further including comparing measurements of a target object signature by the arrangement of gradiometers to known target object signatures to identify the target object.

17. A magnetic screening system, comprising:

means for applying unequal weights to outputs of at least three magnetometers in a gradiometer in an arrangement of gradiometers;

means for combining the unequally weighted outputs to orient a direction of sensitivity toward a volume of interest; and means for using the gradiometers in a collective manner to detect a target object.

* * * * *